United States Patent
Tresenfeld

(10) Patent No.: US 8,669,875 B1
(45) Date of Patent: Mar. 11, 2014

(54) PET CARE NOTIFICATION SYSTEM AND METHOD

(76) Inventor: Eugene Lee Tresenfeld, Eugene, OR (US)

(*) Notice: Subject to any disclaimer, the term of this patent is extended or adjusted under 35 U.S.C. 154(b) by 514 days.

(21) Appl. No.: 12/927,052

(22) Filed: Nov. 4, 2010

(51) Int. Cl.
*G08B 23/00* (2006.01)

(52) U.S. Cl.
USPC ............ 340/573.1; 340/573.3; 340/521; 340/531; 340/540

(58) Field of Classification Search
USPC ........ 340/573.1, 573.3, 506, 521, 531, 539.1, 340/540, 825.69; 235/375, 376; 283/67, 70, 283/74, 75
See application file for complete search history.

(56) References Cited

U.S. PATENT DOCUMENTS

| | | |
|---|---|---|
| 5,036,610 A | 8/1991 | Fehr |
| 6,369,705 B1 * | 4/2002 | Kennedy .................. 340/506 |
| RE38,343 E | 12/2003 | Bergman et al. |
| 7,578,433 B1 | 8/2009 | Benson |
| 7,810,844 B2 | 10/2010 | Dominguez |

OTHER PUBLICATIONS www.petsguardian.com, at least Jan. 28, 2011.
www.luckypet.com/owner-alert.php, at least Jan. 24, 2011.

* cited by examiner

*Primary Examiner* — Hung T. Nguyen
(74) *Attorney, Agent, or Firm* — Risto A. Rinne, Jr.

(57) ABSTRACT

A business method includes a system for providing notification to a designated pet care provider to ensure that care will be provided to a subscriber's pets, animals, or livestock in the event the subscriber is unable to care for his/her pets due to an injury, hospitalization, death or unexpected delay. The system includes a card that is provided to the subscriber with a unique ID number and telephone number on the card. An authorized person, upon finding the card, calls the telephone number to inform the system of an incapacitation or death of the subscriber. After confirming the validity of the call the system then attempts to contact the designated pet care provider. If a willing pet care provider is not reached within a predetermined period of time a local authority could be contacted to provide temporary care for the subscriber's pets. Optional levels of service are also described.

21 Claims, 10 Drawing Sheets

REGISTRATION FORM

Annual membership for the basic service is $29.95. Check if __ single __ couple
                                                                                              57     58       60      62

For a couple living at the same address, the additional cost is $7.00. ~64

Password can be a combination of letters and numbers from 4 up to 16 characters.
~26

| NAME |  |
|---|---|
| Home # |  |
| Mobile # |  |
| Work # |  |
| email |  |
| Password |  |

~65

| NAME |  |
|---|---|
| Home # |  |
| Mobile # |  |
| Work # |  |
| email |  |
| Password |  |

~66

Address: _____  _____
         Street                                                       Apt./Unit

67

City                                      State/Province

Zip code/Postal code

If you register as a couple, the first person we would try to contact would be the other
68 ~ person of your pair. (Obviously, if something occurred to you both at the same time, we
    would start immediately with the other named people.) If we can not reach your

FIG. 6 significant other, how long would you like us to wait before we contact someone else? We would try to reach your significant other again before initiating calls to the other people.

(pop up selections) __ 2 hours __ 4 hours __ 6 hours __ 8 hours __ 10 hours
__ 12 hours __ 14 hours __ 16 hours __ 18 hours  ~70

Designate below up to 4 people (the more people the better it is) who would be willing to care for your pets/animals in case of an emergency. We recommend the people you designate are those who don't live too far away. Talk to them about what you are asking of them. Provide them with instructions on feeding and care. Be sure these people have a key to your residence and if you have a security system, make sure they have the security code. ~72

If you were unable to resume taking care of your pets/animals in the future, the person who would keep them in the long term might not be the same as the people living within a reasonable distance from you. ~74

This is a 24 hour service. If the designated people would not want to be called at all hours, please mark your time zone and indicate the hours NOT to call. ~76

__ Eastern __ Central __ Mountain __ Pacific __ Alaska __ Hawaii
__ New Foundland __ Atlantic Do not call between ____ (pop up selections) and ____ (pop up selections) ~78

| NAME | Home # | Mobile # | Work # | E-MAIL |
|------|--------|----------|--------|--------|
|      |        |          |        |        |
|      |        |          |        |        |
|      |        |          |        |        |
|      |        |          |        |        |

Is there someone who would not be asked to give care for your pet/animal (such as a relative who lives at a distance), yet you'd like us to contact in case of an emergency? ~82

NOTE: We will always keep calling until we have spoken to someone to care for your pet/animal. However, if we can not reach the non care giver, we will leave a voice message asking them to call us.

FIG. 7

| NAME | Home # | Mobile # | Work # |
|------|--------|----------|--------|
|      |        |          |        |

~83

Again, this is a 24 hour service. If the person would not want to be called at all hours, mark his/her time zone and indicate the hours NOT to call.

__ Eastern __ Central __ Mountain __ Pacific __ Alaska __ Hawaii
__ New Foundland __ Atlantic

84

Do not call between ___ (pop up selections) and ___ (pop up selections)

35

If you want to have more than two ID cards per subscriber (perhaps you have more than one vehicle or you just want space cards), indicate how many more ID cards you want (scroll) 1 2 3 4

35   35   86

Additional ID cards are $1.50 each at the time of subscribing or renewing. At other times they are $2.50 each.

87

Other situations for which we offer expanded coverage:

1. (a) You're involved in activities such as hiking, boating, cross country skiing, snowmobiling, whereby if something were to happen to you, you might not be found too quickly. (b) You travel and use a pet sitter or kennel. The pet sitter is scheduled to leave at a certain time on a certain day or the kennel expects the pet to be picked up on a pre-arranged date. Something happens and your in no position to inform the pet sitter or kennel you won't be returning as planned. [Note: Our 800 number can receive calls from the U.S., Puerto Rico and Canada.]

88 {

You would contact us through the web site, text message, phone, mail or email before your outing/trip. You'd let us know what time you are due to return. If you haven't notified us (via the web site or text message) that you've returned by the time you had given us, we will first try to contact you in case you just forgot. If we can not reach you, then we will call the designated people as well as the pet sitter/kennel when applicable. You can authorize release of your pet to a designated caregiver.

You may also let us know where you were going. If you did suffer some mishap, it would be useful information for us to be able to inform the police that you hadn't come back when expected and where you had gone.

Additional ___ $7.00 a year ___ $12.00 for a couple

2. If you're involved in activities such as jogging and boating where you might not have your wallet with you (you will be sent an ID card), you can order an ID tag with your

ID # and our 800 number. The tag has two holes, so you can run your laces through it or attach it with a safety pin. — 91

$2.00 per tag — 92

(scroll) number of tags

94 {
What pets/animals do you have (check all you have):

___ dog ___ cat ___ hamster ___ fish ___ mouse/rat ___ guinea pig

___ bird ___ snake ___ bunny ___ ferret

___ horse ___ llama ___ chicken/duck ___ pig ___ cow ___ sheep

___ goat

Other: enter here _____
}

SUBMIT — 96

FIG. 9

PET CARE NOTIFICATION SYSTEM AND METHOD

BACKGROUND OF THE INVENTION

1. Field of the Invention

The present invention, in general, relates to pets, animals, and livestock and, more particularly, to a method and system for providing care to pets, animals and livestock in the event an owner becomes unable to do so.

Owners in general are responsible for the care and well being of pets, animals, and livestock. As used hereinafter, the word "pet" or "pets" includes all common, unusual or exotic types of pets, as well as all animals and livestock. This care includes feeding and watering as well as spending time with their pets. It may also include providing shelter or maintenance of the shelter that is provided during the day or night. As used hereinafter, the word "owner" or "owners" includes anyone who actually owns the pet or pets or anyone who is responsible for the management and care of one or more pets. As used hereinafter, the word "subscriber" or "subscribers" refers to any owner or owners who have obtained (purchased) a membership in and thereby have the right to use at least a basic level of service of the pet care notification system and method.

In the event that something unforeseen occurs, such as an accident, injury, incapacitation or death of the owner, the pet's may go unattended for an extended period of time.

Certain types of pets require daily care or they are apt to perish. If unattended for a period of time, many pets are placed at extreme risk. All will, to one degree or another, suffer.

Pet owners often feel a great deal of love for their pets. They want their pets to be well cared for should they happen to pass before their pets pass away. As such they may even arrange for the funding of their pets through estate planning. Similarly, they may talk with and designate someone who will provide care or even take over ownership of their pets should they become incapacitated or deceased. However, the problem with all prior art solutions is one of timing. Should the pet owner suddenly become unable to provide care for their pets, or if the pet owner should suddenly pass away, it could be days until someone becomes aware of what has happened to the pet owner and who also knows that there are pets that need attending to. By then it may already be too late for the pets.

Some people carry emergency contact information in their day planner or elsewhere that may be used during times of emergency. There are several problems with this that can prevent pets from receiving the timely care that they need. First, emergency or authorized personnel may not find the emergency contact information in the person's day planner. This is likely because emergency personnel are focused with attending to the needs of the owner when the owner is in distress. In particular, emergency personnel will not be looking in obscure places for information that relates specifically to any pets the owner may have. Also, it is unlikely that the information will be periodically updated.

For information that may be placed in the person's wallet there is no way to ensure that it is current or that key people who may find it will know what to do with any information that may be in the person's wallet. Also, the purpose of such information may not be obvious to emergency personnel who may be examining the contents of the person's wallet.

If something were to happen to the person, whereby the person was unable to care for their pets, how would the pets receive the necessary care? This is something that is of concern to numerous people.

Second, if the emergency contact person's information is found by the emergency or authorized person, it may not be possible to contact the emergency person during the time of the emergency for various reasons. Also, the person's contact information may have changed from that which is recorded. In addition, no backup emergency contact person is likely to be listed.

Additionally, even if a person were to carry in his wallet (or purse) the name and phone number of one or more people who could provide temporary care for the person's pets, anyone finding that information might not realize its intent and therefore might not act after finding it. It is important to remember that the primary responsibility of emergency personnel is to provide emergency care services for the person. And in the event that emergency personnel concerned with saving the person's life were to find such information and if, in response, they made an attempt to place a call to one or more of the people who could provide the temporary care it is exceedingly unlikely that the busy emergency personnel would, in anyway, follow through with additional telephone calls to the people who could provide the temporary care if they were not reached initially. In other words, the emergency personnel would not persist in their attempt to make contact with the people who could provide the temporary care. Furthermore, if the people who could provide the temporary care declined to do so for any reason or if they could not be reached, the emergency personnel would not continue to seek alternative solutions that would help provide timely care of the person's pets.

Third, even if the emergency contact person is reached he or she may not remember that there are pets that need attending. The emergency contact person is likely, instead, to be focused on the health, condition and whereabouts of the person and how the emergency is impacting the person's job and/or family. The needs or even the existence of any pets may be completely overlooked.

Fourth, the emergency contact person may not even know that the person has any pets. The owner may never have told the emergency contact person that he or she has one or more pets. It is also possible that the owner made arrangement with the emergency contact person to provide assistance to the person and/or the person's family before the owner had any pets in which case the emergency contact person may not have any knowledge that the owner had since acquired pets that needed attending.

Accordingly, there exists today a need for a pet care notification system that helps to ameliorate the above-mentioned problems and difficulties as well as ameliorate those additional problems and difficulties as may be recited in the "OBJECTS AND SUMMARY OF THE INVENTION" or discussed elsewhere in the specification or which may otherwise exist or occur and that are not specifically mentioned herein.

As various embodiments of the instant invention help provide a more elegant solution to the various problems and difficulties as mentioned herein, or which may otherwise exist or occur and are not specifically mentioned herein, and by a showing that a similar benefit is not available by mere reliance upon the teachings of relevant prior art, the instant invention attests to its novelty. Therefore, by helping to provide a more elegant solution to various needs, some of which may be long-standing in nature, the instant invention further attests that the elements thereof, in combination as claimed, cannot be obvious in light of the teachings of the prior art to a person of ordinary skill and creativity.

Clearly, a pet care notification system and method would be useful and desirable.

2. Description of Prior Art

While the structural arrangements of a notification system and method for attending to the needs of pets, animals, or livestock if an owner is unable to do so is not known, other notification systems may, at first appearance, appear to have similarities with the present invention, however they differ in material respects. These differences, which will be described in more detail hereinafter, are essential for the effective use of the invention and which admit of the advantages that are not available with the prior systems and methods.

OBJECTS AND SUMMARY OF THE INVENTION

It is an object of the present invention to provide a pet care notification system that attempts to provide notification to one or more designated pet care providers during certain situations in which an owner is unable to attend to his or her pets.

It is also an important object of the invention to provide a pet care notification system that includes a basic level of service and an optional enhanced level of service.

Another object of the invention is to provide a pet care notification system that optionally includes or allows a creation of an instruction set which includes feeding, watering, shelter, medication, and general care information for a subscriber's pets that the subscriber of the pet care notification system may or the pet care notification system may provide to each of the subscriber's designated pet care providers.

Yet another important object of the invention is to provide a pet care notification system that includes a secure database that a subscriber can access and, after accessing the database, change any of the subscriber-variable content appertaining to the subscriber in order to maintain accuracy of data in the database including, for example, changing a number and type of pets that the subscriber has, updating pet care instructions for a designated pet care provider, changing whether the subscriber is a single person or is subscribing as part of a couple, including new information or updating a name and contact information of a partner of the subscriber, updating the name(s) and contact information of any emergency contact people, removing previous or adding new designated pet care providers, updating the contact information of any of the designated pet care providers, providing contact information (i.e., a telephone number) of a police department that is proximate the subscriber, providing contact information for a local chapter of the American Society for the Prevention of Cruelty to Animals (ASPCA), Humane Society, a local veterinarian of the subscriber or any other local authority that may be able to assist in providing care for the subscriber's pets, upload one or more photographs of the subscriber, or upload one or more photographs of any of the subscriber's pets.

Yet a separately important object of the invention is to provide a pet care notification system that assigns to a subscriber a user identification (ID) name and assign or allow the subscriber to create a password by which the subscriber can gain access to a personal account and update subscriber-variable information, thereby offering assurance to the subscriber that sensitive, personal or subscriber-alterable data remains secure.

Still another object of the invention is to provide a pet care notification system that attempts to provide peace of mind to a subscriber of the pet care notification system.

Still yet another object of the invention is to provide a pet care notification system that includes an automated renewal feature for renewing a subscription to the pet care notification system.

Still yet another important object of the invention is to provide a pet care notification system that includes a verification process whereby the pet care notification system, after receipt of a call from a recognized authority or authorized person, places a return call to the authority person that has contacted the pet care notification system to confirm an identity and validity of the authority person, and thereby confirm the inability of a subscriber to attend to the needs of his or her pets.

A first continuing object of the invention is to provide a pet care notification system that includes a process whereby an operator of the pet care notification system may initially call a subscriber using all of the subscriber's provided numbers (cellular, work, home) to verify if a need for notification of a partner, an emergency contact person, a pet care provider, or other authority is warranted subsequent to a generation of a condition that would otherwise warrant such notification taking place by an operator of the pet care notification system when the status of the subscriber cannot otherwise be verified with certainty.

A second continuing object of the invention is to provide a pet care notification system that prevents death or lessens suffering to pets or other animals.

A third continuing object of the invention is to provide a pet care notification system that provides a card to a subscriber to carry instructing police, fire and rescue personnel, hospital workers, emergency workers, coroners, or mortuary workers to place a telephone call to a given number on the card that, when placed, informs a system operator of the pet care notification system about an incapacity of the subscriber identified on the card whether the subscriber is identified on the card by name or by an ID number, or by both.

A fourth continuing object of the invention is to provide a pet care notification system that provides a card to a subscriber to carry instructing police, fire and rescue personnel, hospital workers, emergency workers, coroners, or mortuary workers to place a telephone call to a given number on the card, send an email or send a text message that is used to inform a system operator of the pet care notification system about an incapacity or death of the subscriber identified on the card.

A fifth continuing object of the invention is to provide a pet care notification system that is inexpensive.

A sixth continuing object of the invention is to provide a pet care notification system that provides a level of assurance to a pet owner that their pets, animals or livestock will be cared for in the event of an emergency or other condition that renders the pet owner unable to care for them.

A seventh continuing object of the invention is to provide a pet care notification system that includes a fee that a subscriber pays periodically.

An eighth continuing object of the invention is to provide a pet care notification system that includes a registration process which a subscriber completes when subscribing to the pet care notification system wherein the registration process provides contact information to the pet care notification system regarding one or more pet care providers that the subscriber has designated as candidates to provide temporary care for the subscriber's pets during an incapacity of the subscriber or upon the death of the subscriber.

A ninth continuing object of the invention is to provide a pet care notification system that includes a basic level of service which provides notification to one or more designated pet care providers if the pet care notification system is contacted by an authorized person regarding an incapacity of a subscriber or upon the death of the subscriber.

A tenth continuing object of the invention is to provide a pet care notification system that includes an optional level of service that can be purchased for an additional fee or, if preferred by the pet care notification system, included in a subscription fee that a subscriber pays periodically and wherein in accordance with the optional level of service a subscriber notifies the pet care notification system when the subscriber will be engaged in distant, unusual, or other activities that could result in a delay of the subscriber's returning home to care for his or her pets, livestock, or other animals.

An eleventh continuing object of the invention is to provide a pet care notification system that includes an optional level of service that can be purchased for an additional fee in which a subscriber notifies the pet care notification system when the subscriber will be engaged in distant, unusual, or other activities that could result in a delay of the subscriber's returning home to care for his or her pets, livestock, or other animals and wherein the subscriber provides to the pet care notification system a date and time that designates the latest anticipated time the subscriber will contact the pet care notification system to notify the pet care notification system of the subscriber's ability to resume care for his or her pets, and wherein the pet care notification system creates an internal timer with alarm that will alert a pet care notification system operator in the event the subscriber has not notified the pet care notification system by the designated time.

A twelfth continuing object of the invention is to provide a pet care notification system that includes an optional level of service that can be purchased in which a subscriber notifies the pet care notification system when the subscriber will be engaged in distant, unusual, or other activities that could result in a delay of the subscriber's returning home to care for his or her pets, livestock, or other animals and wherein the subscriber provides to the pet care notification system a date and time that designates the latest anticipated time the subscriber will contact the pet care notification system to notify the pet care notification system of the subscriber's ability to resume care for his or her pets, and wherein the pet care notification system creates an internal timer with alarm that will alert a pet care notification system operator in the event the subscriber has not notified the pet care notification system by the designated time and wherein if the subscriber has not made contact with the pet care notification system to effectively cancel the internal timer with alarm by the designated time, the pet care notification system operator is made aware of the alarm condition at or shortly after the designated time, and wherein the pet care notification system operator accomplishes whatever notification actions have been established during a registration process by the subscriber or, alternately, the pet care notification system operator accomplishes a default set of notification actions.

A thirteenth continuing object of the invention is to provide a pet care notification system that includes an optional level of service that can be purchased in which a subscriber notifies the pet care notification system when the subscriber will be engaged in distant, unusual, or other activities that could result in a delay of the subscriber's returning home to care for his or her pets, livestock, or other animals and wherein the subscriber provides to the pet care notification system a date and time that designates the latest anticipated time the subscriber will contact the pet care notification system to notify the pet care notification system of the subscriber's ability to resume care for his or her pets, and wherein the pet care notification system creates an internal timer with alarm that will alert a pet care notification system operator in the event the subscriber has not notified (i.e., made contact with) the pet care notification system by the designated time and thereby cancel the internal timer with alarm by the designated time, the pet care notification system operator is made aware of the alarm condition at or shortly after the designated time, and wherein the operator attempts to verify status of the subscriber by initially attempting to contact the subscriber using all the subscriber's provided numbers (cellular, work, home) and after calling the subscriber if the operator learns that the subscriber is alright, the operator would take no further action other than document that subsequent to the arising of the alarm the operator placed one or more phone calls which confirmed that the subscriber was able to resume care for his or her pets, or in the event the operator could not confirm that the subscriber was able to resume care of his or her pets, the operator would follow the subscriber-established or default procedures for contacting, if specified, a partner or a person to contact in case of emergency and for contacting a designated pet care provider until a willing designated pet care provider has been contacted, or in the event no willing pet care provider can be reached, for contacting an authority proximate the subscriber that may be able to provide care or arrange for care to be given to the subscriber's pets.

A fourteenth continuing object of the invention is to provide a pet care notification system that optionally suggests that a subscriber of the pet care notification system personally create on their own an instruction set which addresses feeding, watering, shelter, medication and general care information for a subscriber's pets and a suggestion that the subscriber of the pet care notification system provide the instruction set to each of the subscriber's designated pet care providers or store the instruction set at the subscriber's home where it is likely to be found by any of the subscriber's designated pet care providers.

A fifteenth continuing object of the invention is to provide a pet care notification system that optionally includes or allows creation of an instruction set which addresses feeding, watering, shelter, medication, and general care information for a subscriber's pets, and wherein the instruction set is stored on a database of the pet care notification system, and wherein when conditions arise that cause the pet care notification system to take action and attempt to contact one or more of the pet care providers that were designated by the subscriber until a willing pet care provider is reached, upon making contact with the willing pet care provider the pet care notification system transmits over the Internet by email the instruction set to an email address of the willing pet care provider.

A sixteenth continuing object of the invention is to provide a pet care notification system that provides notification to a pet sitter or to a kennel that has a pet owner's (subscriber's) pets in the event of an emergency or other condition that renders the pet owner unable to resume caring for their pets at the expected time.

A seventeenth continuing object of the invention is to provide a pet care notification system that provides notification to a pet sitter or to a kennel that has a pet owner's (subscriber's) pets in the event of an emergency or other condition that renders the pet owner unable to resume caring for their pets at the expected time and which informs the pet sitter or kennel of a name of a person authorized by the pet owner who will be assuming temporary care of the pet owner's pets.

An eighteenth continuing object of the invention is to provide a pet care notification system that a pet owner (subscriber) can contact when going on a trip and when the pet owner's pets are at a kennel or at a pet sitter's residence or when a pet sitter is at the pet owner's residence attending to the pet owner's pets.

A nineteenth continuing object of the invention is to provide a pet care notification system that provides advance notification to hospitals and hospital workers, doctors, healthcare professionals, firemen, search and rescue personnel, coroners, veterinarians about the services provided by the pet care notification system and to look for an ID card, and wherein the ID card includes a distinctive appearance that makes it easily recognizable, and wherein the ID card provides clear instructions to people finding the ID card as to what they should do if the person possessing the ID card is not capable of caring for their pets.

A twentieth continuing object of the invention is to provide a pet care notification system that provides (by email or US Postal Service mail) periodic reminders urging a subscriber of the system to verify and update, as needed, contact data information for one or more designated pet care providers.

A twenty-first continuing object of the invention is to provide a pet care notification system that provides (by email or US Postal Service mail) periodic reminders at least twice a year urging a subscriber of the system to verify and update, as needed, contact data information for one or more designated pet care providers.

A twenty-second continuing object of the invention is to provide a pet care notification system that provides a service, when needed, whereby an operator of the pet care notification system will attempt to contact over a predetermined period of time one or more pet care providers as designated by a subscriber and, if the operator is unsuccessful in contacting a pet care provider who is willing to provide temporary care of the subscriber's pets, then after the predetermined period of time has elapsed the operator will attempt to contact other organizations or emergency providers such as the Humane Society, the Association for the Prevention of Cruelty to Animals, a police or fire department located near to the subscriber, a Veterinarian (as specified by the subscriber), or any other person or organization that might be able to provide temporary care for the subscriber's pets.

A twenty-third continuing object of the invention is to provide a pet care notification system that provides a solution to a problem facing pet owners (subscribers) about providing timely care for the pet owner's pets in the event that something unexpected should occur which prevents the pet owner from providing such care, thereby lessening a level of worry or concern on the part of the pet owner.

A twenty-fourth continuing object of the invention is to provide a pet care notification system that provides increasing awareness to pet owners (subscribers) over the course of time that a solution exists to a problem facing every pet owner about providing timely care for their pets in the event that something unexpected should occur which prevents the pet owner from providing such care.

A twenty-fifth continuing object of the invention is to provide a pet care notification system that can automatically send a text message to a cell phone of a subscriber when warranted and, if a reply text message is received within a predetermined reply time, a computer and database of the system is used to discern the reply text message, confirm whether the subscriber is able to resume providing care for his or her pets and, if the subscriber is determined to be okay, automatically cancel any internal associated alarm(s) and document the event without involvement of an operator of the pet care notification system.

Briefly, a pet care notification system that is constructed in accordance with the principles of the present invention has a computer with a database which is connected to an Internet. During a registration process, a subscriber provides personal information and contact information to the pet care notification system that identifies one or more pet care providers who the subscriber has designated as possible candidates to care for the pets, animals or livestock of the subscriber upon the death or incapacity of the subscriber, or if the subscriber is otherwise unable to provide such care for their animals. According to a basic level of service, the subscriber pays a fee for membership to the pet care notification system for a designated period of time, for example on an annual basis. The subscriber is then provided with one or more identification (ID) cards that include a unique ID number which identifies the subscriber to the pet care notification system. The ID card may also include additional subscriber information, such as the subscriber's name and/or address. If desired, a photograph of the subscriber could appear on the ID card. The subscriber is instructed to carry the ID card in a wallet or purse and/or in a glove box of each vehicle the subscriber uses. A smaller version of the ID card (or tag) could be provided and affixed to a shoelace or to a bathing suit (with a safety pin type of attachment), if desired. In the event of accident, injury, hospitalization, or death of the subscriber, authorized personnel are instructed to look for the ID card and call the pet care notification system using a number provided on the ID card. Preferably, the ID card will have a unique color or appearance to assist in its recognition. During the call, the authorized person provides the ID number on the card of the subscriber to the pet care notification system and, if available on the ID card, the name, address, description and other information regarding the subscriber. The authorized person may provide this information by speaking to a system operator on a telephone, over the Internet, by an automated phone call that prompts the authorized person to enter information or by any other preferred means. As a result, an alarm condition is generated by the pet care notification system which causes the pet care notification system operator to be alerted to the situation (if the operator is not already aware). The operator initially places a return call to confirm the validity of the authorized person who placed the call. If the call is deemed to be valid, the pet care notification system operator initiates a predetermined procedure of attempting to make contact with at least one pet care provider that was designated by the subscriber. The designated pet care provider is a person whom the subscriber has verified is willing to provide at least temporary or short-term care to his or her pets during a time of emergency when the subscriber is unable to do so. Typically, the designated pet care provider has been provided with a key for entry to the subscriber's home or stable (if necessary), alarm codes for deactivating an alarm system at the home of the subscriber (if necessary), and specific instructions for the special needs of the pets, feeding information such as the type of feed and its location, any medication needs and the location of any required medicines, and providing water and adequate shelter. Ideally, contact information for more than one designated pet care provider has been supplied to the pet care notification system during the registration process by the subscriber. Ideally, the subscriber is encouraged to frequently update all subscriber and designated pet care provider information with the pet care notification system, for example, every six months. Preferably, the registration process as well as any updating is accomplished online and without operator assistance. If the call (or contact) is determined to be invalid (i.e., a prank or hoax) the operator will place a call to the subscriber alerting the subscriber as to what has happened, however, the operator will not initiate the normal predetermined or default procedures for contacting people when the call is deemed invalid. After a valid call has been received, the pet care notification system operator calls each designated pet care provider in the preferred order and during the specified times as designated by the subscriber according to an established procedure until contact is made with a designated pet care provider who agrees to provide the short-term pet care. At that time the pet care notification system has fulfilled its responsibility. The operator (or, when possible, the system automatically) documents information regarding the condition that generated the alarm, any contact that was made, and the willingness of the designated pet care provider who was willing to provide pet care for the subscriber. After a predetermined period of time has elapsed, if the pet care notification system operator is unable to contact any designated pet care provider who is willing to provide the pet care service, the pet care notification system operator will contact a local authority who may be able to provide the pet care service if that information is available to the operator. For example, the pet care notification system operator could contact a local police department, a local fire department, a local chapter of the American Society for the Prevention of Cruelty to Animals (ASPCA), a local chapter of the Humane Society, or the subscriber's veterinarian, to attempt to ensure that care is provided for the subscriber's pets. If desired, the subscriber can also specify the name or names of one or more long-term pet care providers whom the subscriber has specified as possibly taking ownership of the subscriber's pets in the event the subscriber will not be able to resume caring for them. If desired, the subscriber may include the name of a partner who could be the first person the operator would attempt to contact in case of an alarm condition. Alternately if desired, the subscriber may include the name of a person to contact in case of emergency who could be the first person, other than the subscriber's partner, the operator would attempt to contact in case of an alarm condition. An optional enhanced service at an additional fee allows the subscriber to inform the pet care notification system when the subscriber will be engaged in distant, unusual, or other activities that could result in a delay of the subscriber's returning home to care for his or her pets. Upon purchase of the optional enhanced service, the subscriber is entitled to submit notification to the pet care notification system designating a date and time that the subscriber believes will be the latest anticipated time for his or her return. The pet care notification system then creates an event timer that counts down toward the designated anticipated time. The subscriber subsequently must also notify the pet care notification system (either by contact with an operator or by automated means) upon his or her return to indicate the subscriber's ability to resume caring for his or her pets. If the subscriber is not excessively delayed by some unforeseen reason, then the notification that is made to the operator (or system) of the subscriber's return will occur prior to the designated latest anticipated time and the operator (or the automated means) will cancel the timer. This will be automatically recorded (i.e., documented) in the system database. If, however, the event timer counts down and reaches the designated latest anticipated time prior to any contact being made by the subscriber informing the system (or operator) of the subscriber's return then an alarm condition is generated. The alarm condition is used to alert an operator of the pet care notification system that the subscriber has failed to contact, and thereby cancel the event timer prior to the designated latest anticipated time for returning home. If the subscriber fails to notify the pet care notification system of his/her return by the designated time, the pet care notification system operator is made aware of the alarm condition at or shortly after the designated time. The operator attempts to verify status of the subscriber by initially attempting to contact the subscriber using all their provided numbers (cellular, work, home). After calling, the operator may learn that the subscriber is alright and in that case takes no further action other than documentation of what has occurred. The operator may also attempt to contact a partner of the subscriber or any person listed as someone to contact in case of emergency before taking further action. The pet care notification system operator documents with whom the operator spoke and documents the information that was received and how it was used to confirm that the subscriber was okay. If the pet care notification system operator does not obtain assurance that the subscriber is okay and able to care for his or her pets, the pet care notification system will follow the subscriber-established procedures for contacting the designated pet care providers. If the subscriber has not established procedures for contacting the designated pet care providers during the registration process then the operator will attempt to contact the designated pet care providers using whatever default protocol and/or procedures are in effect for either basic or optional enhanced levels of service. A financial penalty may be imposed on subscribers that purchase the optional or enhanced level of service and who forget to contact the pet care notification system upon their timely return home. Procedures for when the subscriber leaves his or her pets at a kennel or with a pet sitter are also described.

BRIEF DESCRIPTION OF THE DRAWINGS

FIG. 6 is a screen image of a sample registration page of the pet care notification system of FIG. 1.

FIG. 7 is a continuation of the screen image registration page of FIG. 6.

FIG. 8 is a continuation of the screen image registration page of FIG. 7.

FIG. 9 is a continuation of the screen image registration page of FIG. 8.

DETAILED DESCRIPTION OF THE INVENTION

Figure 1:
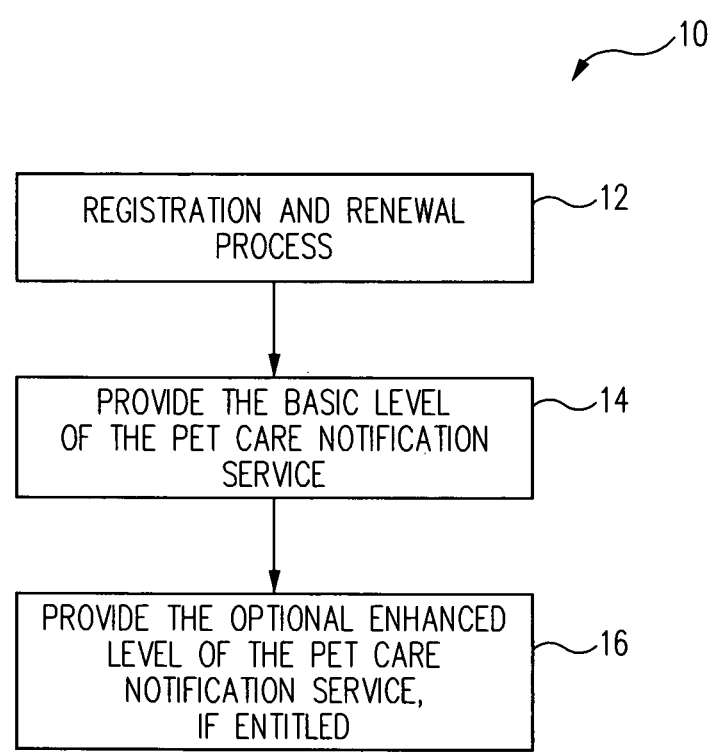
FIG. 1 is an executive level flowchart of a pet care notification system.

Referring on occasion to all of the FIGURE drawings and now, in particular to FIG. 1, is shown an executive level flowchart of a pet care notification system, identified in general, by the reference numeral 10. As used hereinafter the word "system" refers to the functionality of hardware and software in cooperation with interactions between an operator, subscribers, various authority personnel, and designated pet care providers that, together, provide the desired benefits. Reference numerals are assigned hereinafter when these elements are actually introduced. As used herein the word "method" refers to how the system accomplishes the steps that are necessary to provide a service that better attends to the needs of pets in case of the occurrence of an emergency or other situation which prevents an owner from attending to his or her pets. As used herein, the word "service" refers to either the system or method.

The reader will notice that reference is occasionally made throughout the DETAILED DESCRIPTION OF THE INVENTION suggesting that the reader refer to a particular drawing FIGURE. The suggestion is at times made when the introduction of a new element requires the reader to refer to a different drawing FIGURE than the one currently being viewed and also when the timely viewing of another drawing FIGURE is believed to significantly improve ease of reading or enhance understanding. To promote rapid understanding of the instant invention the reader is encouraged to periodically refer to and review each of the drawing FIGURES for possible cross-referencing of component parts and for other potentially useful information.

The pet care notification system 10 includes a registration and renewal process 12 by which a company (i.e. an organization that manages, owns, or is otherwise entitled to make available the services of the pet care notification system 10) requests information from a subscriber 18 (See FIG. 2) during the registration and renewal process 12.

The pet care notification system 10 provides at least a basic level of the pet care notification service 14 and, if offered by the company, an optional enhanced level of the pet care notification service 16, if the subscriber 18 is entitled to its use. Other optional services not specifically mentioned herein may also be included by the company as part of the services that are provided by the pet care notification system 10.

Figure 2:
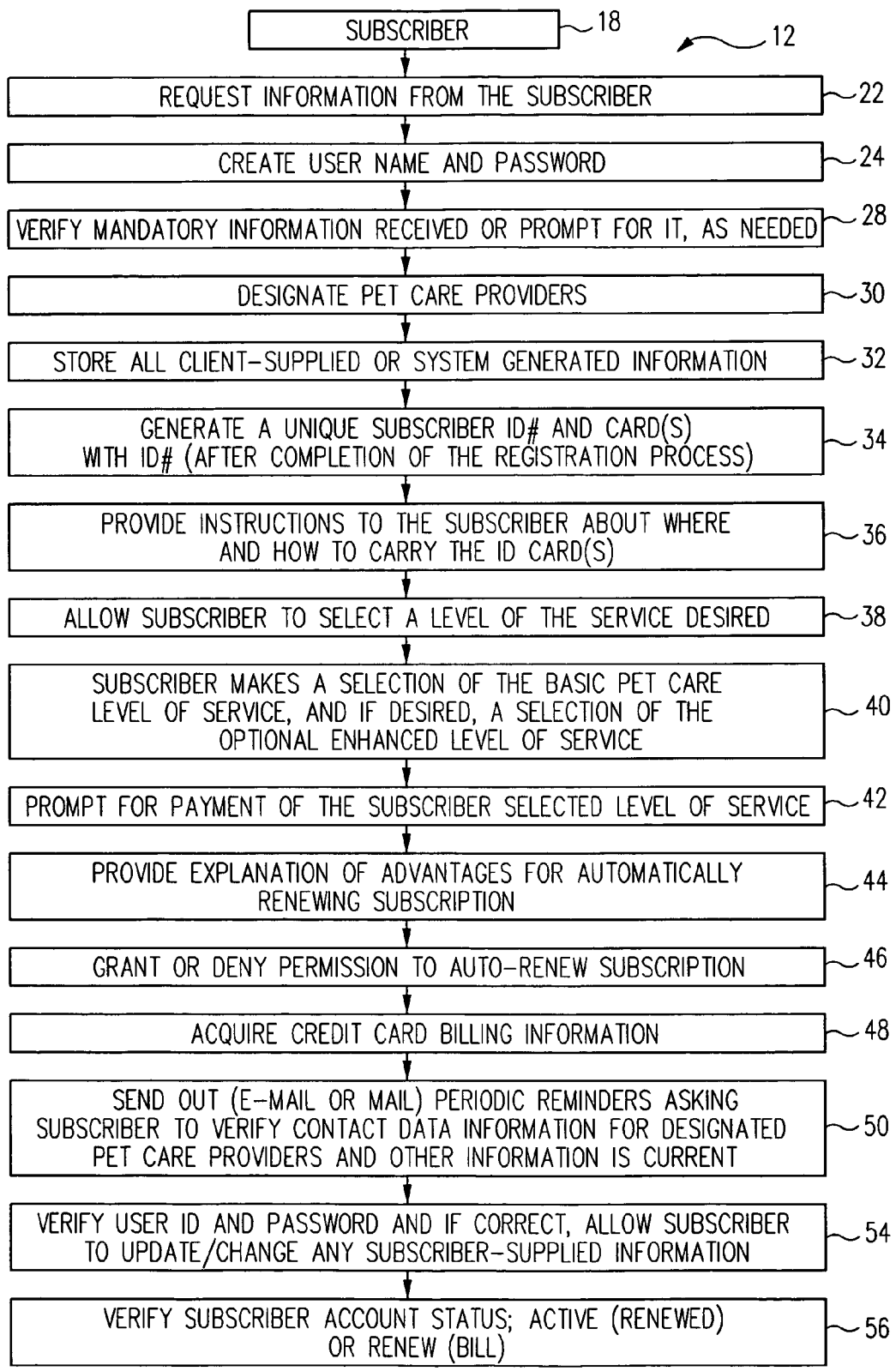
FIG. 2 is a flowchart of the registration process of the pet care notification system of FIG. 1.

Now referring to FIG. 2 is shown a more detailed flowchart of the registration and renewal process 12 for the pet care notification system 10.

During discussion of FIG. 2, please also occasionally refer to FIGS. 6-9 which show sample online (or possibly hardcopies of) registration pages. It is to be understood that the information, capabilities, and costs that are shown in FIGS. 6-9 are included only to provide an example useful for understanding and are not in anyway intended to be limiting. A more detailed discussion regarding FIGS. 6-9 is included hereinafter.

Figure 5:
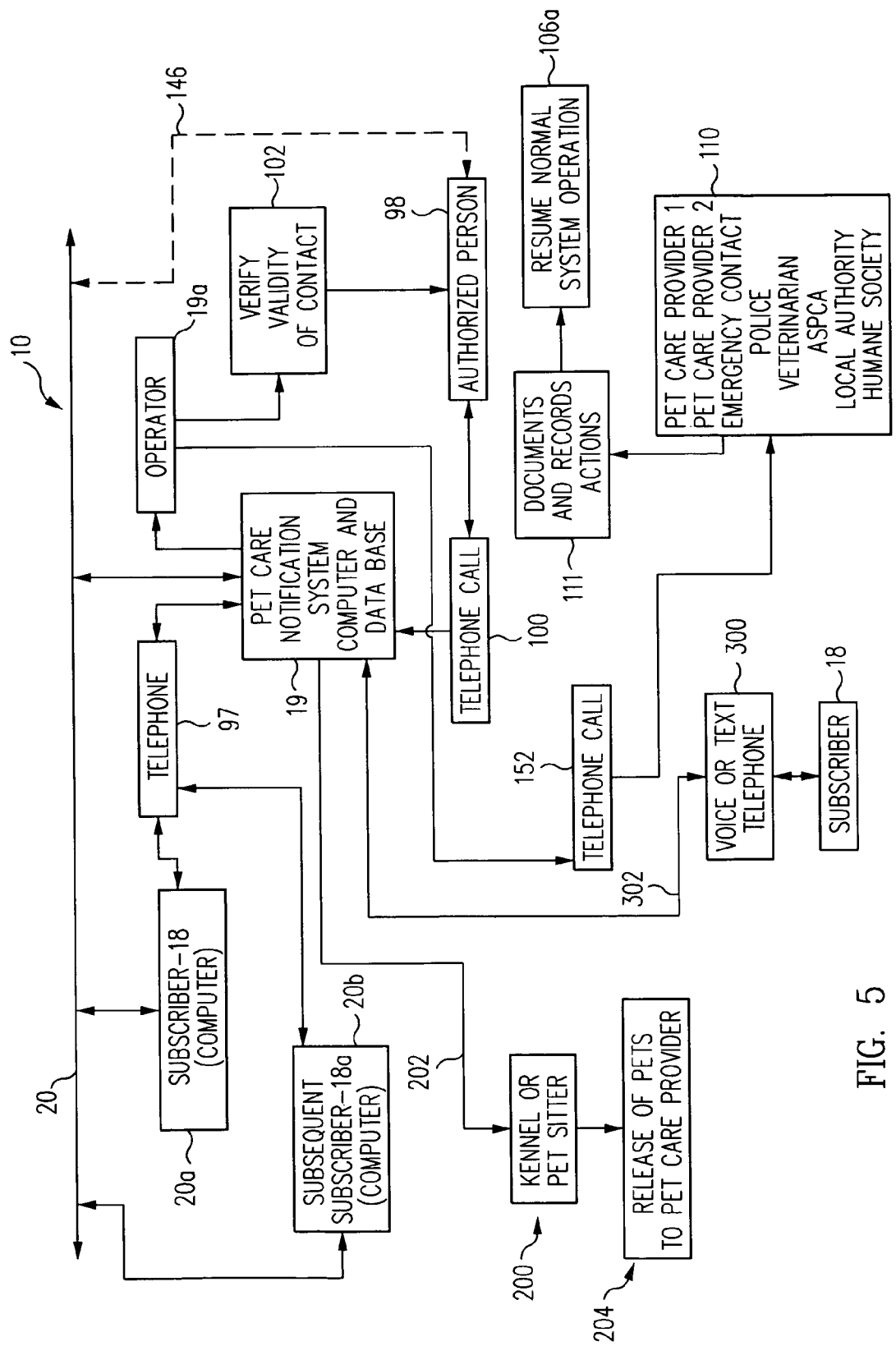
FIG. 5 is a block diagram of the pet care notification system of FIG. 1.

To begin the registration and renewal process 12, the subscriber 18 initiates contact with the pet care notification system 10. By way of the registration and renewal process 12, the pet care notification system 10 attempts to obtain requested information 22 from the subscriber 18. Some of that information may be optional and some is required. During the registration and renewal process 12, the requested information 22 and any optional information provided by the subscriber 18 is retained in a database and computer 19 of the pet care notification system 10 (FIG. 5).

As described in greater detail hereinafter, the information 22 may be supplied to the pet care notification system 10 by using any preferred means as determined by the pet care notification system 10, and especially by electronic registration as over an Internet 20 (FIG. 5) or by telephone 97 key-sequencing which satisfies automated prompts, both of which are preferred methods for an obtaining of requested information 22 (FIG. 2) from the subscriber 18. The subscriber 18 optionally may register 12 using a personal computer 20a (FIG. 5) over the Internet 20. Other subscriber(s) 18a may use a subsequent personal computer 20b to register 12 over the Internet 20.

Alternately, the information may be provided by the subscriber 18 speaking directly with an operator 19a (FIG. 5) of the pet care notification system 10. The operator 19a is an employee who works for the pet care notification system 10. At least one operator 19a is always on duty.

The subscriber 18 is given the opportunity to create a username and a password 24 or, alternately, either or both may be assigned by the pet care notification system 10. Referring briefly to element 26 in FIG. 6 is an example of possible instructions regarding the creation of the password 24 by the subscriber 18. FIG. 6 is described in more detail hereinafter. If desired, the username could be the email address of the subscriber 18.

After the requested information 22 from the subscriber 18 has been furnished, the pet care notification system 10 verifies that all mandatory information is received 28, or prompts for it, as needed, until it has been received. The requested information 22 requires the subscriber 18 to designate a pet care provider 30 (at least one and preferably more) that they want to be contacted in the event that the subscriber 18 suddenly becomes unable to care for his or her pets.

After the pet care notification system 10 has verified that all mandatory information has been received 28, the pet care notification system 10 computer and database 19 retains the information by storing all client-supplied or system generated information 32. The pet care notification system 10 computer and database 19 then generates a unique subscriber identification (ID) number 34 and one or more ID cards 35 (refer briefly to FIG. 8) with the unique ID number 34.

It may also be possible that the unique ID number 34 may be stored in electronic form and carried by the subscriber 18. Either the ID card(s) 35 or electronic form of the ID number 34 provides a means for the identification of the subscriber 18 by the pet care notification system 10.

The pet care notification system 10 may provide a set of instructions 36 to the subscriber 18 about where and how to best carry the ID card(s) 35 to aid in their being seen when necessary. This is described in greater detail hereinafter. The instructions 36 for where and how to carry the ID card(s) 35 may suggest locations, such as the subscriber's 18 wallet or purse, on key chains, or inside automobile glove boxes or automobile console cabinets. Any other safe, accessible location may be recommended, that allows the ID card 35 to be retained by the subscriber 18.

The instructions 36 may also include methods of keeping the ID card(s) 35 on the subscriber 18, such as when the subscriber 18 is swimming, jogging, or during any activity where wallets, purses, key chains, or automobiles etc. are not practical. The ID card(s) 35 can be provided in any desired size and with any desired type of attachment. If desired, one of the ID card(s) 35 can be attached to a shoelace (not shown) or a bathing suit.

It is highly desirable that the ID card(s) 35 include a distinctive appearance that make them easily recognizable to emergency personnel or anyone else who may find the ID card 35 on the person. For example, a distinctive size or shape may be included with the ID card 35. If desired, a unique logo or service mark may be imprinted on the ID card 35. If desired, a particular color scheme or pattern may be imprinted on the ID card 35.

The subscriber 18, during the registration and renewal process 12, may be allowed to select a level of the service desired 38 by the subscriber 18 by electing 40 either the basic level of the pet care notification service 14 or the optional enhanced level of the pet care notification service 16, if both levels 14, 16 are offered. It is anticipated that the basic level of service 14 will always be provided; however, the pet care notification system 10 may or may not offer the optional enhanced level 16.

If the subscriber 18 elects 40 the basic level of the service 14 then, when activated (i.e., paid for), the basic level of the pet care notification service 14 (FIG. 1) is provided.

Alternatively, if the subscriber 18 elects 40 the optional enhanced level of the pet care notification service 16, then when activated, the optional enhanced level of the pet care notification service 16 (FIG. 1) is provided.

After the subscriber 18 has elected 40 the level of the service that is desired 38, the subscriber 18 will eventually be prompted for a payment for the subscriber's 18 selected level of service 42. It is to be understood that the flowchart of the registration and renewal process 12 of FIG. 2 includes one possible sequencing of the steps necessary for the registration and renewal process 12 and that many other variations are, of course, possible after having had benefit of the instant disclosure. The same is true for all flowcharts as well as for variations in the configuration of the block diagram of FIG. 5.

It may be that during this step or during some other aspect of the registration and renewal process 12, the subscriber 18 is presented with an explanation of the significant advantages for automatically renewing their subscription 44 to the pet care notification service 10.

An important advantage that can be stated in the explanation for automatically renewing the subscription 44 is to reduce the risk that the pet care notification service 10 will expire due to the subscriber 18 failing to contact the company (that administers the pet care notification system 10) and renew their subscription for the pet care notification service 10. Also, there is increased peace of mind for the subscriber 18 since the pet care notification service 10 will, if automatic renewal 44 is elected by the subscriber 18, automatically renew 44 the previously elected 40 level of service 14, 16. This provides assurance to the subscriber 18 that there will not be any interruptions of service because the subscription to the service that the subscriber 18 has elected 40 can never expire. Accordingly, the subscriber 18 will be asked to provide credit card information and to authorize (i.e., verbally or by responding to a prompt or by clicking on a button on a web page) the company that administers the pet care notification system 10 to automatically renew 44 the subscription at the same level of service 14, 16 whenever the registration and renewal process 12 again becomes due.

Wherein after the subscriber 18 has considered the explanation of advantages for automatically renewing the subscription 44, the subscriber 18 makes a decision to grant or deny permission to automatically renew the subscription 46 by the pet care notification system 10.

As mentioned above, when the subscriber 18 grants permission to automatically renew the subscription 46, the pet care notification system 10 acquires the necessary credit card billing information 48 from the subscriber 18. When automatic renewal 44 has been authorized, the credit card billing information 48 is retained in the pet care notification system 10 computer and database 19 (FIG. 5). When automatic renewal 44 is not authorized, the credit card billing information 48 is used for the single transaction but is not retained in the pet care notification system 10 computer and database 19. In addition to credit card payment methods, it may also be possible to provide for payments for the automatic renewal 44 of the subscription to be made by way of automatic bank withdrawals, such as with PayPal, or by online banking bill-pay services, or by any other automatic payment method not mentioned here. When automatic renewal 44 is not authorized, payment by check or money order may be allowed.

It is expected that the pet care notification system 10, will send out (email or mail) periodic reminders 50 asking the subscriber 18 to verify and update contact data information for the designated pet care providers 30, to renew their subscription when it becomes due, and to ensure that other information on file is also current. The subscriber 18 would use their username and password 24 to access and update (i.e., maintain) their user-alterable information fields.

Periodic reminders 50 may be issued at regular intervals (such as at six months intervals), to assist in improving the likelihood that the information in the pet care notification system 10 computer and database 19 (FIG. 5) remains up to date and accurate.

When the subscriber 18 desires to update or change any information that they can change in their account, they may be prompted for their username and password 24, (or possibly their unique ID number 34 and/or password 24) preferably by way of communication over the Internet 20 (FIG. 5). Then the pet care notification system 10 must verify the username and password 24 or the user ID number 34 and password 24, and if correct, allow the subscriber 18 to update/change any subscriber 18 supplied information 54.

The pet care notification system 10 may also have the ability to verify the status of the subscriber's 18 subscription by a verification of the account, if active (renewed) or if it needs renewing (payment) 56. If it needs renewing the subscriber 18 would be asked (prompted) to make payment or to reconsider authorizing automatic renewing of their account to occur.

To provide a more complete description of the registration and renewal process 12 of the pet care notification system 10, please refer now to the sample registration pages FIGS. 6-9.

During the request for information from the subscriber 22, the subscriber 18 may be presented with registration forms similar to the examples shown in FIGS. 6-9; however any design of registration form, or other way of acquiring the information needed may be used. While the sample registration pages reflect possible web pages that are accessed over the Internet 20 it is also possible for the subscriber 18 to complete paper forms and mail or FAX them along with payment (check, money order or credit card information and authorization to charge the credit card).

Referring now to FIG. 6, is shown a sample of a screen image of a registration page of the pet care notification system 10. Please also refer occasionally to FIGS. 3-4A.

The example of the registration form of FIG. 6 may include information as shown, or any other information as desired by the pet care notification system 10.

In the example provided, an indication of subscription duration and cost 57 for services, along with a status designation 58 may appear (either for a single 60 subscriber 18 or if subscribing as a couple 62). As used hereinafter, the word "partner" is used when referring to the other party of the couple 62.

A suggested additional cost 64 for a couple living at the same address is shown.

The subscriber(s) 18 may be presented instructions or restrictions about creating passwords 26, as previously mentioned.

At a minimum, the subscriber 18 must provide the pet care notification system 10 information, including, but not limited to, their name, contact details, and the password 24 the subscriber 18 created (unless the password 24 is assigned by the pet care notification system 10). An example showing information that may be required of the subscriber 18 appears as a data table 65. Additionally, the example shows a subsequent data table 66 that may be used to contain information appertaining to the partner when subscribing as the couple 62.

The subscriber 18 may also be required to provide the physical location of their pets, whether that may be their home, or at another location. On the example registration form, an area is provided for entry of the subscriber's 18 address 67. As shown, space is provided for the apartment/unit number, city, state or province, and zip code, or postal code on the registration form.

The registration form may also provide other information for instructing the subscriber 18 such as appears beginning at the bottom of FIG. 6, and continuing onto FIG. 7. Such information may explain a process 68 that the pet care notification system 10 can use if there is a couple 62 subscribing to the pet care notification service 10.

Referring now to FIG. 7, a selection to specify a period of time to wait 70 if the partner 62 cannot be reached, may be indicated. This period of time to wait 70 would need to lapse before the pet care notification system 10 attempts to contact any of the designated pet care providers 30.

In an effort to assist the subscriber 18 when choosing the designated pet care providers 30, a set of recommendations 72 similar to the sample of text shown in FIG. 7 may be presented. The recommendations 72, though not limited to those presented herein, may suggest choosing people who do not live too far away or they may suggest that the subscriber 18 explains to the designated pet care providers 30 what is being asked of them.

There may be recommendations 72 for providing the designated pet care providers 30 with feeding and care instructions for the subscriber's 18 pets, as well as providing a reminder to the subscriber 18 to provide keys or security system information to the designated pet care providers 30 to allow access to the subscriber's 18 pets.

Any other desired instructions or information can be included in the set of recommendations 72 to further allow the subscriber 18 to equip the designated pet care providers 30 with whatever information or resources the pet care providers 30 may need to provide an easy and optimum level of care for the subscriber's 18 pet(s) upon the inability of the subscriber 18 to do so him or herself.

The pet care notification system 10 may also suggest that the subscriber 18 consider identifying a long-term pet care provider 74 who may not be the partner 62.

Since the pet care notification system 10 intends to operate twenty-four hours a day, seven days a week, and there is no intended geographical limitation for the pet care provider services 10 to be rendered, the pet care notification system 10 may allow the subscriber 18 to indicate a time zone 76 with respect to the location of the designated pet care providers 30. There may be certain designated pet care providers 30 the subscriber 18 knows would not want to be contacted at certain times or between certain times. Therefore, an opportunity for the subscriber 18 to indicate a do-not call range of time 78 may be provided.

Contact details for the designated pet care providers 30 must be made available to the pet care notification system 10. The sample registration form FIG. 7 indicates an area as indicated by bracket 80, for the subscriber to list the name, home, mobile, and work phone numbers, and possibly e-mail addresses (see bracket 80a, dashed lines) of, at least one and, preferably more than one, designated pet care provider 30.

There may be other parties that the subscriber 18 may want the pet care notification system 10 to try to contact. Another individual may be a non-care provider 82 of the subscriber's 18 pets who the subscriber 18 would wish to contact during an emergency. For example, the subscriber 18 may want the pet care notification system 10 to contact a relative or possibly even an employer of the subscriber 18.

Continuing now with FIG. 8 the sample registration form may include an area 83 for listing contact information regarding the non-care provider 82. The form may allow a time zone or a do-not call time range 84 for the non-care provider 82 to be specified by the subscriber 18.

FIG. 8 indicates a process by which the subscriber 18 can determine and specify the number of ID cards 35 desired as shown by instructions 86. If additional costs are to be charged for extra ID cards 35, (above the standard quantity) this is shown by instruction 87.

On the lower half of FIG. 8 the example of text, as shown by bracket 88, further explains details about the optional enhanced level of the pet care notification service 16. The example of text 88 explains some possible features, provisions, usages or costs (prices shown may be any value) for subscribing to the optional enhanced level of the pet care notification service 16.

The example of text 88 explains why the optional enhanced level of the pet care notification service 16 is advantageous at times. For example, when the subscriber 18 intends to be involved in activities that could potentially delay or even prevent the subscriber's 18 ability to resume caring for his or her pets the optional enhanced level of the pet care notification service 16 is desirable. For example, the subscriber 18 may be in a location where they might not be found for an extended period of time. That time could include several days or more. Therefore, it is desirable to provide the enhanced level of the pet care notification service 16 to ensure that the subscriber's pets receive care when the subscriber's 18 return time is delayed beyond that which is anticipated. This is especially true when the subscriber 18 is unable to notify anyone of his or her predicament.

The example of text 88 also summarizes how the optional enhanced level of the pet care notification service 16 is used and it shows a sample additional cost for subscribing to the optional enhanced level of the pet care notification service 16 (in addition to the basic level of service 14).

Optionally, information 90 may be given regarding times that the subscriber 18 may be involved in activities where carrying the ID card(s) 35 could be difficult or impractical, and that the subscriber 18 may desire alternate means of having their unique ID number 34 with them.

Continuing also to FIG. 9, the pet care notification system 10 may offer the subscriber 18 ID card(s) 35 for use at times when standard ID cards 35 cannot be carried. Therefore, information about alternative forms, such as an ID tag (i.e., a variation of the ID card 35) with two holes 91 may be made available for the subscriber 18. A suggested cost for each ID tag (or each additional ID card 35) is shown along with an opportunity to order a desired quantity 92 of ID tags or ID cards 35 is provided.

Toward the middle half of the example registration page FIG. 9 is a sample listing of types of pet(s), indicated by bracket 94, that may be owned by the subscriber 18. The subscriber 18 may select from among the more common types of pet(s) 94 that the subscriber 18 owns, or alternatively, the subscriber 18 can specify any other type of pets that is not included with the sample listing 94.

Although not shown on the listing of types of pet(s) 94, other changes to this field are anticipated, including providing opportunity for the subscriber 18 to list how many pets they have (i.e., the total number of pets), the names of each pet, the type (species, breed, etc.) of each pet, the age of each pet, and any other information that might be useful.

Similarly, changes to any of the various registration fields are possible to include whatever information might be useful or otherwise desired.

Any information that the subscriber 18 provides during the registration and renewal process 12, which includes but is not limited to, the requested information 22 on forms FIGS. 6-9, must be retained by the pet care notification system 10. Preferably, the requested information 22 is retained in the pet care notification system 10 computer and database 19.

If the registration and renewal process 12 is accomplished over the Internet 20, then the most probable method for the pet care notification system 10 to acquire subscriber 18 information is for the subscriber 18 to click on a submit 96 function icon or button. For example the subscriber 18 may be presented a submit button on their computer 20a, 20b screen during the registration and renewal process 12 that can be selected or clicked on to complete the registration and renewal process 12 after all mandatory information 28 has been supplied.

If the registration and renewal process 12 is accomplished over the telephone 97 (refer briefly to FIG. 5), then the subscriber 18 may submit 96 the completed forms FIGS. 6-9 by any viable means that ensures the pet care notification system 10 receives all requested information 22 from the subscriber 18.

As another option, the subscriber 18 may be able to speak directly with the pet care notification system 10 operator 19a to supply the requested information 22. However additional costs may be incurred by the subscriber 18 who chooses this method. The pet care notification system 10 operator 19a would thereby need to capture (i.e., enter) the subscriber's 18 requested information 22, and save the requested information 22 in the pet care notification system 10 computer and database 19.

By whatever means the pet care notification system 10 attempts to obtain the subscriber's 18 requested information 22 (by way of the Internet 20, prompts satisfied over the telephone 97, pet care notification system 10 operator 19a involvement, etc.) the storage of client supplied and system generated information 32 must occur.

The pet care notification system 10 may retain requested information 22 in hard-copy (paper files) form (not shown). Hard-copies could be advantageous if ever the pet care notification system 10 computer and database 19 become inaccessible (i.e. power outage, computer malfunction, and so forth). It is also desirable to maintain backup of a redundant computer and database (not shown) capability, preferably at a remote location with respect to the computer and database 19.

Figure 3:
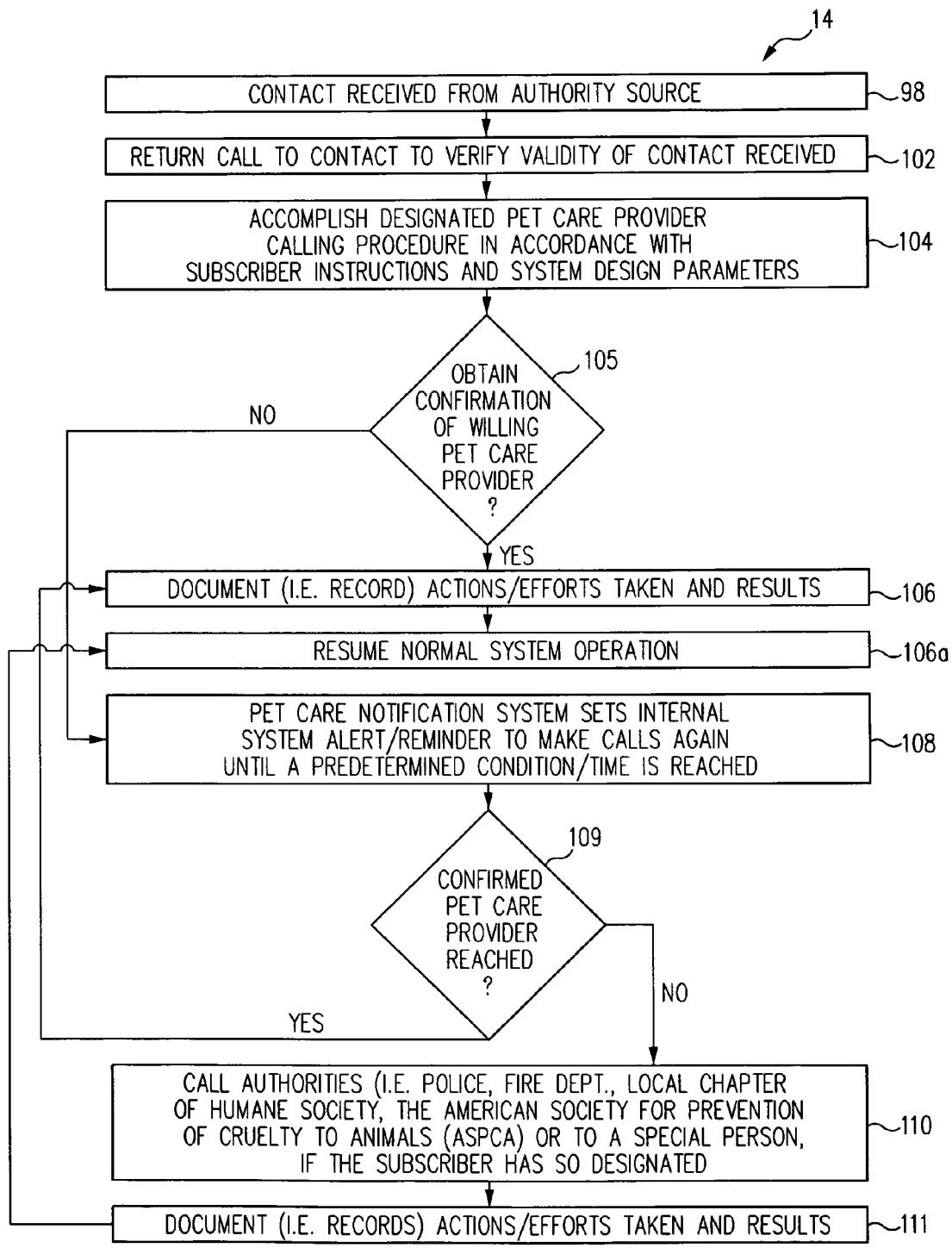
FIG. 3 is a flowchart of the basic pet care level of service of the pet care notification system of FIG. 1.

Now referring to FIG. 3, is shown a flowchart of the basic level of pet care notification service 14 of the pet care notification system 10 of FIG. 1.

When the pet care notification system 10 receives a contact from an authorized person 98 by a phone call 100 (Refer occasionally to FIG. 5), the pet care notification system 10 attempts to learn the authority person's 98 telephone number. The authorized person 98 may also contact the pet care notification system computer and database 19 over the Internet 20 (as shown by dashed line 146). The authorized person 98 would be contacting the pet care notification system 10 upon finding the subscriber's 18 ID card 35 when the subscriber 18 is not able to provide care for their pets for whatever reason.

Prior to taking any other action, the pet care notification system 10, using the phone number provided by the authorized person 98, attempts to make a return call to verify validity of the contact received 102 (i.e. to confirm whether or not the contact that was made by the authorized (or authority) person 98 is valid or a hoax). If it is determined that the contact received 102 was not from a valid authority person 98, the operator 19a would contact the subscriber 18 (if not already accomplished) to inform the subscriber 18 as to what happened. This could occur as a prank if someone were to obtain the subscriber's 18 ID card 35. It is possible then that a new ID number and new ID card(s) 35 would be issued to the subscriber 18. The operator 19a would then preferably enter event details in the computer and database 19.

If the validity of the contact received 102 is verified, then the basic level of the pet care provider notification service 14 is activated. The pet care notification system 10 operator 19a then begins an accomplishing of designated basic pet care provider calling procedures in accordance with subscriber instructions and system design (i.e., default) parameters 104.

If the pet care notification system 10 operator 19a succeeds in obtaining or contacting and confirming 105 the availability of any designated pet care provider 30 who is willing to provide temporary care of the subscriber's 18 pets, then the operator 19a documents (i.e. enters and stores) the actions/efforts taken and results 106 in the pet care notification system 10 computer and database 19. As far as that subscriber 18 is concerned, the basic level of service 14 would then have been satisfied (because a willing designated pet care provider 30 has been found) and operation of the pet care notification system 10 would return to normal 106a. Of course, if the subscriber 18 had a partner 62, the partner 62 would also be notified as would any person designated to call in case of emergency.

As mentioned above, should the pet care notification system 10 operator 19a be unable to verify validity of the contact received 102, then optionally, the basic level of the pet care notification service 14 would attempt to contact the subscriber 18 to ascertain whether the subscriber 18 is okay, or if the subscriber 18 cannot be reached, then optionally, the basic level of the pet care notification system 14 may attempt to call others, such as the partner 62, or any persons designated to call in case of emergency (not shown) to attempt to verify whether or not the subscriber 18 is okay.

Alternately, according to a preferred embodiment of the pet care notification system 10, if the operator 19a is unable to verify the validity of the contact received 102 and is also unable to contact the subscriber 18 to determine whether the subscriber 18 is okay, the default action is to then assume that the contact received 102 was valid and that the subscriber 18 is not okay. The pet care notification system 10 operator 19a, operating consistent with this embodiment, need not attempt to contact anyone else to determine whether or not the subscriber 18 is okay. Instead, the pet care notification system 10 operator 19a would begin making whatever calls would normally be made (as described herein) as would occur when the validity of the contact received 102 had been confirmed as valid.

If the pet care notification system 10 obtains contact or confirmation 105 of the willing pet care provider 30 or any others who can confirm the subscriber 18 is okay, then the pet care notification system 10 operator 19a will document (i.e. record) actions/efforts taken and results 106 and resume normal system operation 106a.

When the basic level of the pet care notification service 14 is unable to contact or confirm 105 any willing designated pet care provider(s) 30, then the basic level of the pet care provider notification service 14 sets (either automatically or by the operator 19a) an internal system alert/reminder to make calls again and to continue doing so until a predetermined condition or time is reached 108.

The predetermined condition or time 108 may be upon reaching a willing designated pet care provider(s) 30, or any alternative person who could assume responsibility of the subscriber's 18 pets. The predetermined condition/time 108 may also include repeating the calling attempt until a predetermined period of time has lapsed.

If after the predetermined time 108 has elapsed and if no confirmed willing 109 pet care providers 30 has been reached, then the basic level of the pet care notification service 14 will preferably begin (if information has been provided or is available) calling (See FIG. 5, reference numeral 152) other authorities 110 (i.e. police, fire department, local chapter of the Humane Society, American Society for Prevention of Cruelty to Animals (ASPCA), or possibly a special person if the subscriber 18 has designated one). The call(s) 152 to the other authorities 110 are intended to locate other people who might be able to provide temporary and timely care for the subscriber's 18 pets. The call(s) 152 are preferably made by the operator 19a (although under certain circumstances they could be automated to come from the pet care notification system computer and database 19).

Upon successfully contacting one of the authorities 110 (i.e. police, fire department, local chapter of the Humane Society, American Society for Prevention of Cruelty to Animals (ASPCA), or a special person if the subscriber 18 has so designated), the pet care notification service 10 operator 19a documents (records) the action/efforts taken and the results 111. The documented (recorded) actions/efforts taken and results 111 are stored 32 in the pet care notification system 10 computer and database 19.

Subsequently, the pet care notification system 10 resumes normal system operation 106a as arrangement for the care of the subscriber's 18 pets has been accomplished. It is to be understood that while the pet care notification system 10 provides significantly improved likelihood that the subscriber's 18 pets will receive care in the event of illness, incapacitation or death of the subscriber 18 it does not guarantee that such care will occur. The pet care notification system 10 is limited by the information furnished by the subscriber 18 as well as by the availability and willingness of all contact people as specified by the subscriber 18. Although unlikely, it is possible that the operator 19a will be unable to contact anyone who can provide timely care for the subscriber's 18 pets.

Figure 4:
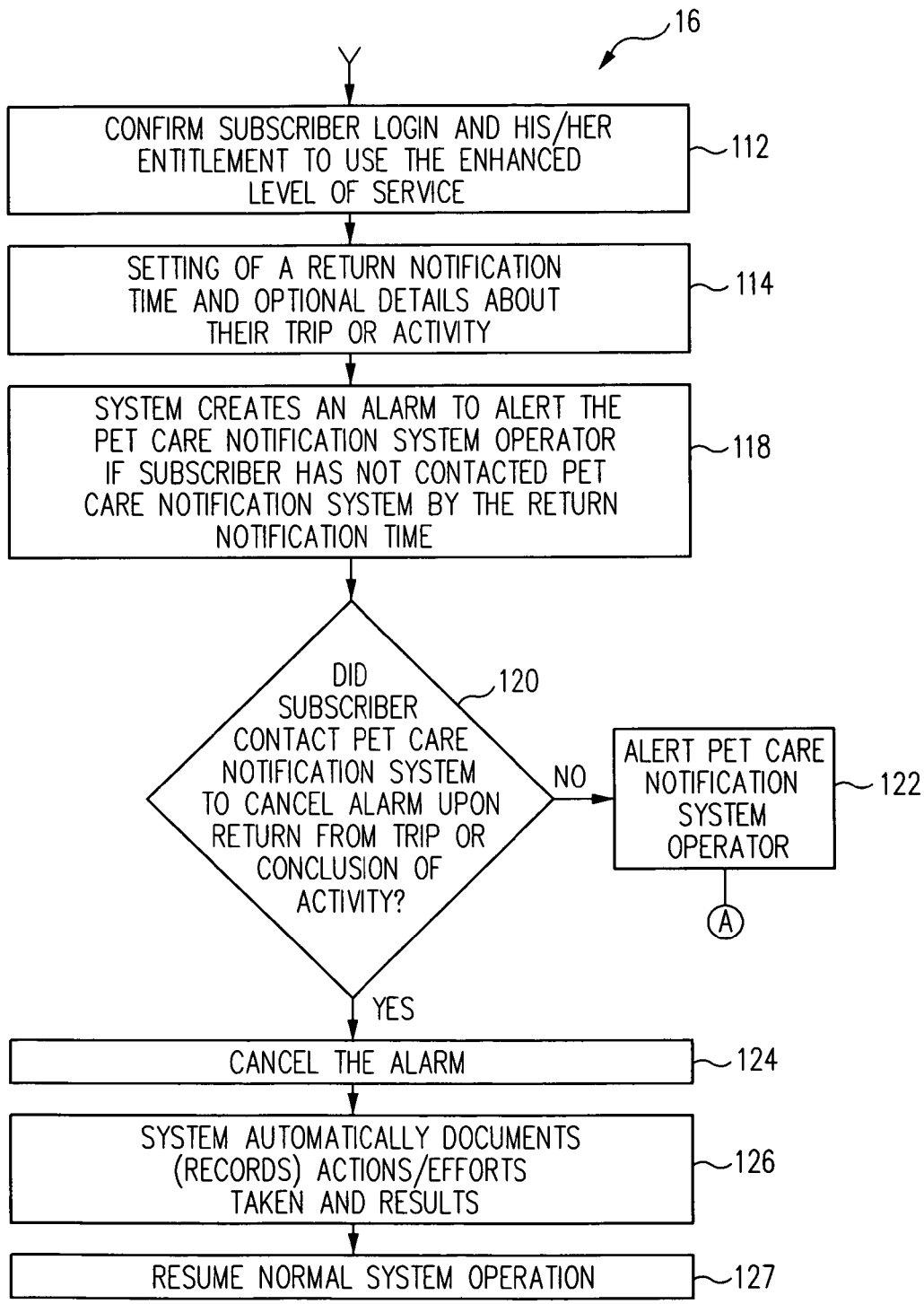
FIG. 4 is a flowchart of an optional enhanced level of service of the pet care notification system of FIG. 1.

Referring now to FIG. 4, is shown a flowchart of an optional enhanced level of the pet care notification service 16 of the pet care notification system 10 of FIG. 1.

During the registration and renewal process 12, the subscriber 18 may have selected and paid for (as previously described in steps 40 and 42 on FIG. 2) the optional enhanced level of the pet care notification service 16.

When the subscriber 18, if entitled, wishes to utilize the optional enhanced level of the pet care notification service 16, the pet care notification system 10 conducts a confirmation during the subscriber's 18 login of his/her entitlement to use the enhanced level of service 112.

If the pet care notification system 10 is unable to confirm the subscriber's 18 entitlement 112 to use the enhanced level of service 16, the pet care notification system 10 may, at that time, provide an opportunity (not shown) for the subscriber 18 to enroll in the optional enhanced level of the pet care notification service 16.

After confirmation 112 of the subscriber's 18 right to use the optional enhanced level of the pet care notification service 16, the pet care notification system 10 allows the subscriber 18 access to use the features of the optional enhanced level of the pet care notification service 16.

To use the enhanced level of the pet care notification service 16, the subscriber 18 would contact the pet care notification system 10 prior to engaging in any distant, unusual, or other activities that the subscriber 18 believes might increase the likelihood that, if something should go awry, could cause a delay in the subscriber's 18 ability to return home to care for his or her pets. The contact the subscriber 18 makes with the pet care notification system 10, as is described in greater detail hereinafter, can occur in various ways, however, the reason and effect of making the contact is to create, in the computer and database 19, a file that includes a return notification time 114 and any optional details that the subscriber 18 may provide about their upcoming trip or activity.

The return notification time 114, can most generally be defined as the time and date that the subscriber 18 has identified as the latest anticipated time that the subscriber 18 expects to return from his or her trip or activity and resume providing care for his or her pets. The subscriber 18 may also provide general or specific details about the location of the subscriber's 18 destination or activity, what type of activity the subscriber 18 plans to be involved in, for example, skiing, hiking, sky-diving, piloting an airplane, boating, including the location of trails to be hiked, ski locations, sky-diving locations, flight plans, and boating locations, etc. The subscriber 18 may be headed for regions where traveling is dangerous or where communication options may be limited or where other factors can affect the subscriber's 18 ability to return home.

The subscriber 18 does not, at the time of making the contact, believe that a delay in returning home will actually occur. To the contrary, the subscriber 18 may have arranged for someone (i.e., a dog-sitter, cat-sitter, or other person who comes to a person's home and provides care for their pets while the owner is away or the subscriber 18 may have taken their pet(s) to a boarding facility such as a dog or cat kennel) to attend to the subscriber's 18 pets during the anticipated time of the activity, for example, for that day or over the course of the weekend. The problem is that when making the pet care arrangements the subscriber 18 will arrange for the dog or cat sitter, for example, to come only for the time that the subscriber 18 expects to be away. If the subscriber 18 does not return when expected there is risk that harm can befall the subscriber's 18 pets. If the subscriber 18 is also unable to contact anyone, for example, if the subscriber 18 is injured and without communication, then there is risk that no one will attend to the subscriber's 18 pets for an extended period of time. The pets can suffer and even perish as a result.

As previously described the basic level of service 14 of the pet care notification service 10 provides a means for better attending to the needs of the subscriber's 18 pets when the subscriber 18 becomes incapacitated and an authorized person 98 learns of the subscriber's 18 incapacity. The authorized person 98, upon finding the ID card 35, contacts the pet care notification system 10 which then makes calls as previously described. This level of service covers most typical emergency situations.

The enhanced level of the pet care notification service 16 expands the scope of coverage and provides an even greater level of assurance to the subscriber 18 that his or her pets will be attended to. The enhanced level of service 16 provides a means for attending to the needs of the subscriber's 18 pets when the subscriber 18 becomes incapacitated or delayed even when no one else is aware of the subscriber's 18 delay or incapacity. As an additional unexpected benefit, the enhanced level of service 16 may also be used to facilitate search and rescue efforts that could help to lessen trauma or even prevent the death of the subscriber 18 by decreasing search and rescue response times.

When the subscriber 18 is attempting to establish the return notification time 114, he or she may have various means available to them for contacting the pet care notification system 10 (i.e., either by contact via the computer and database 19 over the Internet 20 or communication with the operator 19a, sending a text message 300 (FIG. 5) or email, or by telephone 97 and responding to a series of automated prompts to a voice communication 300).

For example, the subscriber 18 may telephone 97 (see FIG. 5), the pet care notification service 10. The telephone 97 call might be received by the pet care notification system 10 operator 19a or the telephone 97 call might be answered by automated equipment and the return notification time 114 established automatically by the subscriber 18 responding to a series of automated questions and prompts. If, however, the subscriber 18 uses the operator 19a, additional service fees may be assessed for the operator's 19a involvement.

According to a preferred way to set the return notification time 114 the subscriber 18 could send the text message 300 (FIG. 5) via a cell phone, for example, to a telephone number of the pet care notification system 10. A communication path 302, whereby the subscriber 18 communicates by telephone with the pet care notification computer and data base 19, is shown in FIG. 5 and it can include automatic recognition by the pet care notification computer and data base 19 of either text messages 300 or voice messages 300. The text message 300 data is routed to the pet care notification system 10 computer(s) where the software of the pet care notification system 10 processes the received text message 300 to extract and format the received information. The required information that needs to be included in the text message 300 minimally includes the subscriber's 18 ID number 34 and password 24 and their return time 114. Other information may also be included in the text message 300.

Various options for ensuring the accuracy of the data extracted are possible. For example, it is possible for the pet care notification system 10 to automatically send a text message 300 back to the subscriber 18 that indicates how the text message 300 was interpreted by the software of the pet care notification system 10. If the data received by the subscriber 18 is not correct, the subscriber 18 could then send another text message 300 back to correct the errant data. If the data received by the subscriber 18 is correct, the subscriber 18 would typically take no further action.

Alternately, a way to set the return notification time 114 is by contact over the Internet 20. The subscriber 18 can either send an email over the Internet 20 that is received and processed by the pet care notification system 10 in a manner that extracts and automatically sets the return notification time 114. Alternately, the subscriber 18 could go to a website of the pet care notification system 10 and to a particular web page that allows the subscriber 18 to enter the required information in a clear and positive manner that also establishes the return notification time 114 and does so without operator 19a involvement. Use of the operator 19a is not desired because it increases the cost of providing all levels of service 14, 16 of the pet care notification system 10.

By any preferred means, the subscriber 18 provides the system 10 with the return notification time 114 and, if desired, with optional details about their trip or activity 114. The pet care notification system 10 stores the return notification time 114 and optional details in the pet care notification system 10 computer and database 19.

Upon the creation of the return notification time 114 an "event" is created. The event continues until the subscriber 18 again makes contact with the pet care notification system 10 (by any preferred means) for the second time (for that particular distant, unusual, or other activity). When the second contact is made the event is canceled. Ideally, the first contact that creates the event and the second contact that effectively cancels the event all occur automatically and without involvement of the operator 19a. During normal operation, events will be created and canceled. The system 10 preferably saves information about each event in the database and computer 19. This information can be used to demonstrate the utility of the pet care notification system 10 to the subscriber 18. It can also be used in defense of any allegation that a good and useful service was not provided to the subscriber 18.

Subsequently after the first contact by the subscriber 18 of the distant, unusual, or other activity has been made, the pet care notification system 10 creates an internal system alarm 118 that is used to alert the pet care notification system 10 operator 19a should the subscriber 18 fail to again contact the pet care notification system 10 before the return notification time 114. If the second contact is made before the return notification time 114, the second contact is used to cancel the event and in particular to cancel the system alarm 118.

If operator 19a involvement is needed for the first or second contact when using the optional enhanced level of the pet care notification service 16 a significant amount of the operator's 19a time may be required for collecting the subscriber's 18 return notification time and trip or activity 114 details. As mentioned before, if one or more operators 19a are involved, the pet care notification system 10 may impose an additional service fee for this involvement.

As previously mentioned, the ability for the subscriber 18 to respond to automated telephone 97 prompts may also allow the subscriber 18 to create the return notification time 114 by a first telephone 97 call as well as to cancel the event by placing a second, automated telephone 97 call. If the pet care notification service 10 is able to accept responses to telephone 97 prompts, then the subscriber 18 can call the pet care notification system 10 without involving the operator 19a. The subscriber 18 preferably can, instead, use the Internet 20 to enter their return notification time and optional details about their trip or activity 114 without operator 19a involvement. The subscriber 18 may also send the text message 300 that includes the return notification time and optional details about their trip or activity 114. The text message 300 is received and processed by the computer and database 19 to extract the desired information.

When an automated telephone 97 system answers the call, the subscriber 18 would respond with key-sequencing. Not only would the subscriber 18 enter their return notification time 114, but quite possibly optional details about their trip or activity may be supplied. For example the subscriber 18 could voice-record details regarding their trip or activity 114 that would only be used by the pet care notification system 10 if the subscriber 18 failed to place the second contact (or call) prior to an elapsing of the return notification time 114 and then only if conditions warranted providing the voice-recording information to the proper people.

The subscriber's 18 return notification time and optional details about their trip or activity 114 would therefore be available to store 32 in the pet care notification system 10 computer and database 19.

Another method that may be available for the subscriber 18 to set the return notification time and optional details about their trip or activity 114 would be by way of the Internet 20. Using any variety of Internet 20 capable devices, the subscriber 18 may enter their user name and password 24 (refer briefly to FIG. 2) or perhaps the unique user ID number 34 and password 24 to log into the pet care notification system 10 computer and database 19. If desired, the text message 300 or telephone 97 call may be used to establish the return notification time or to provide other optional details.

Upon the subscriber 18 entering his or her return notification time and optional details about their trip or activity 114 by whatever means the subscriber 18 uses to do this, the alarm 118 to alert the pet care notification system 10 operator 19a if the subscriber 18 does not contact the pet care notification system 10 by the return notification time 114 is established (i.e., created).

It may even be possible for the subscriber 18 who elects the optional enhanced level of the pet care notification service 16 to upload the subscriber's 18 personal photograph(s) for use, if needed, by authorities for identification purposes. If the need arises (when utilizing any version or aspect of the pet care notification system 10) the subscriber's 18 personal photograph(s) may be emailed to the police or other authority. Alternatively, the subscriber 18 may be able to upload photographs of his or her pets, if desired (not shown). Photos of the pets may be useful for both the basic and enhanced levels of service 14, 16.

Unless the pet care notification system 10 receives the second contact from the subscriber 18 to cancel the alarm 118 upon the subscriber's 18 return from their trip or upon the conclusion of their activity 120 before the return notification time 114 has passed, an alarm is used to alert 122 the pet care notification system 10 operator 19a. The alert 122 to the pet care notification system 10 operator 19a may be visual, auditory, or visual and auditory, or may be of any design intended to obtain the attention of the pet care notification system 10 operator 19a.

Possible events following the alert 122 to the pet care notification 10 system operator 19a are described in more detail hereinafter.

According to the normal course of events the subscriber 18 would safely return from their outing or activity before the return notification time 114 had occurred and the subscriber 18 would also contact the pet care notification system to cancel the alarm 120. This is the typical sequence of events. When the subscriber 18 succeeds in contacting the pet care notification system 10 (for the second time related to that particular event) before the return notification time 114 (has passed) using whatever means possible (i.e., the telephone 97 or the Internet 20 or by text messaging 300) to inform the pet care notification service 10 that he or she has returned, then a cancellation 124 of the time and alarm 118 occurs.

Upon cancelling 124 the alarm 118, the pet care notification system 10 preferably automatically documents (records) the actions/effort taken and the results 126. The pet care notification system 10 would then resume normal system operation 127. In this way, numerous subscriber's 18 over the course of time may be utilizing the enhanced level of the pet care notification service 16, each contacting the pet care notification system 10 prior to leaving on their outing or activity to set the return notification time 114 and then later, upon their return, again contacting the pet care notification system 10 to cancel the alarm 120, all of which is being accomplished in an automated fashion and without operator 19a involvement. This is desirable to lower the cost of providing the services and benefits of the pet care notification system 10.

Figure 4A:
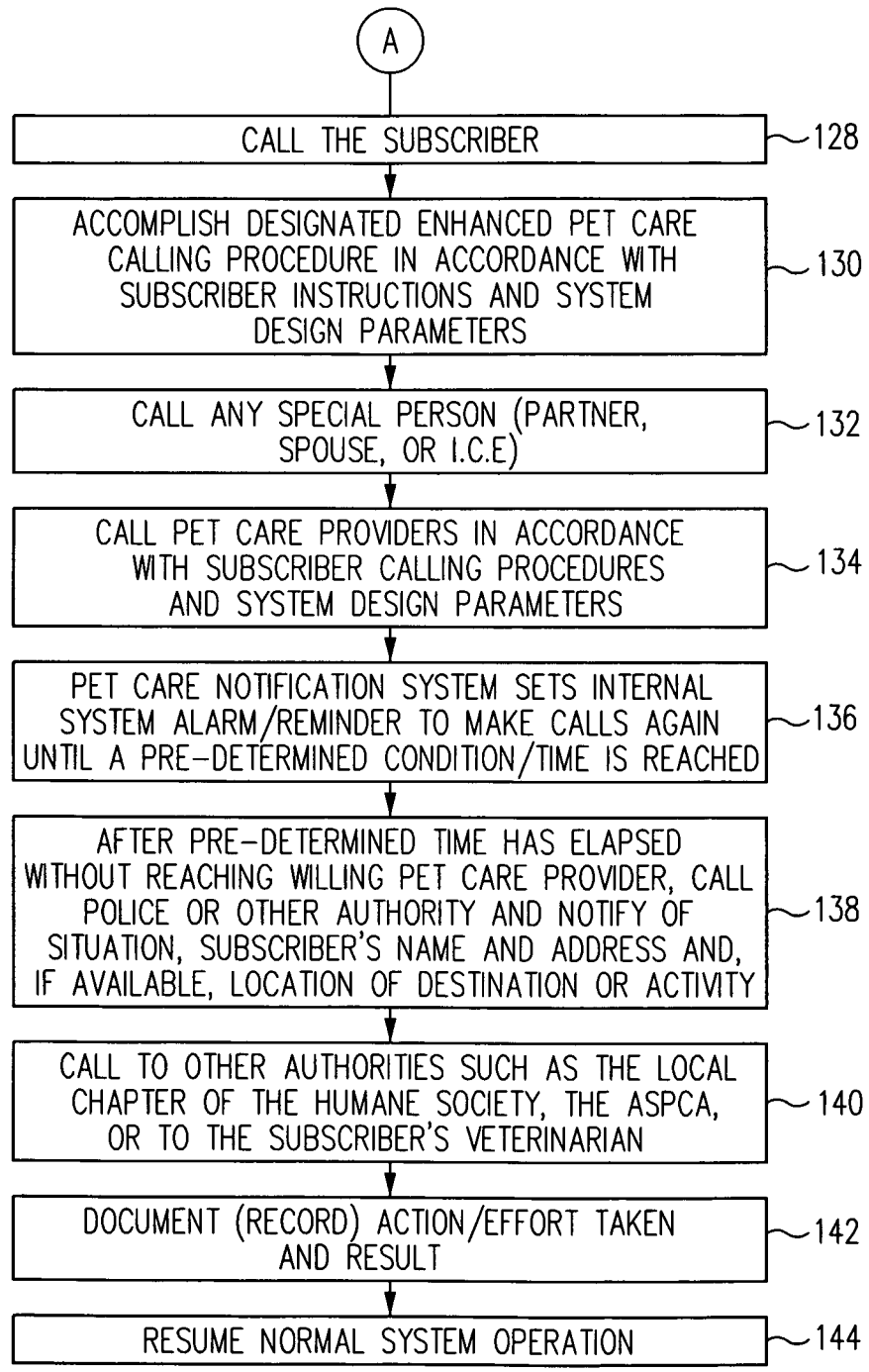
FIG. 4A is a continuation of the flowchart of FIG. 4.

Referring now to FIG. 4A is a continuation of the flowchart of FIG. 4. Please occasionally refer as well to FIG. 4.

If the subscriber 18 has not contacted the pet care notification system 10 before the return notification time 114 has passed, the alert 122 to the pet care notification system 10 operator 19a occurs. There is one exception, as described in greater detail below, for an automated text message 300 inquiry process that delays operator 19a involvement when the subscriber 18 has a cell phone. If the subscriber 18 does not have a cell phone, the pet care notification system 10 operator 19a would be alerted 122 by the system 10. The operator's 19a typical first course of action would then be to call 128 the subscriber 18. The call 128 to the subscriber 18 is intended to learn whether the subscriber 18 is truly unable to care for his or her pets or if he or she forgot to make the second contact 120 to cancel 124 the alarm 118.

Again, it is desirable to minimize operator 19a involvement. As it is human nature to sometimes forget things, it is likely that some subscriber's 18 will, from time to time, forget to place the return call or otherwise forget to contact the pet care notification system 10 to cancel the alarm 120. There is an automated way (i.e., without operator 19a involvement) that can be utilized by the pet care notification system 10 to determine if the subscriber 18 simply forgot to place the call to cancel the alarm 120 by the pet care notification system computer and database 19 automatically sending a text message 300 inquiry to the subscriber's 18 cell phone subsequent to the pet care notification system computer and database 19 determining that the return notification time 114 has elapsed without the subscriber 18 having contacted the pet care notification system 10 to cancel the alarm 118.

For clarification, the subscriber 18 may or may not know that he or she is effectively canceling the alarm 118 when contacting the pet care notification system 10 upon their return from the outing or activity 120. From the subscriber's 18 perspective the return contact 120 is being made to provide notification of a safe trip which is being used to conclude the event. However, from the perspective of the pet care notification system 10 a countdown timer based on the return notification time 114 and the alarm 118 that is associated with the event are what is being canceled. And, as mentioned earlier, the event and its cancellation (i.e., the basis for canceling the event being the return contact 120 that was made and the form of that contact 120) are documented by the pet care notification system 10. It is preferable that this documentation occur automatically, by utilization of the computer and database 19. However, if required, the operator 19a can accomplish any necessary documentation.

If the subscriber 18 has not returned in time (i.e., before the return notification time 114) and if the subscriber 18 has provided the pet care notification system 10 with a cell phone number, the text message 300 inquiry is automatically sent to the subscriber's 18 cell phone. It might be a simple message such as, "Are you okay?" A predetermined amount of reply time is provided to allow for the subscriber 18 to respond by sending a reply text message 300 back to the pet care notification system 10 computer and database 19. The reply text message 300 from the subscriber 18 might say, "OK", "I Am Fine" or any of numerous other possible responses that the pet care notification system 10 computer and database 19 is programmed to discern. Such a reply text message 300 would be sent by the subscriber 18 if the subscriber 18 was able to resume caring for their pets and had forgotten to contact the system 10 to cancel the alarm 120. Upon receipt of the reply text message 300 the alarm 118 is canceled and the system 10 automatically documents the event and the basis (i.e., the reply text message 300) for its cancellation.

Another possible scenario would occur if return of the subscriber 18 was delayed beyond that of the original return notification time 114 and the subscriber 18 anticipated resuming care of their pets sometime after the original return notification time 114. If return by the subscriber 18 is delayed, the reply text message 300 can include an updated (i.e., a later) return notification time 114 that the computer and database 19 would use to establish an extended (i.e., the updated) later return notification time 114 and cancel the previous or original return notification time 114. If the subscriber 18 fails to contact the pet care notification system 10 before the updated (i.e. extended or later) return notification time 114 passes, the steps as described above would simply be repeated.

In this way, inquiry of the status of the subscriber 18 and canceling of the alarm 118 can occur automatically and without any operator 19*a* awareness or involvement.

If, however, the predetermined amount of reply time has elapsed without receipt of a confirming reply text message 300 that the subscriber 18 is okay, then the operator 19*a* would be alerted 122 by the system 10. In this event the operator 19*a* would then place a telephone call to the subscriber 18 (using any other available number) to try and determine if the subscriber 18 was okay.

Should the pet care notification system 10 operator 19*a* succeed in confirming that the subscriber 18 is okay, the pet care notification system 10 operator 19*a* would cancel 124 the alarm 118, and then document (record) the actions/effort taken 126. The pet care notification system 10 would then resume normal system operation 127.

However, the pet care notification system 10 operator 19*a* may not be able to reach the subscriber 18 or otherwise confirm whether or not the subscriber 18 is okay. At that point, the optional enhanced level of the pet care notification service 16 will accomplish the enhanced pet care calling procedure 130 in accordance with the subscriber's 18 instructions (made during the registration process 12 or later provided or updated) or in accordance with a default pet care calling procedure for the enhanced level of service 16.

After generation of the alert 122, the enhanced pet care calling procedure 130 may require the pet care notification 10 system operator 19*a* to attempt to reach a special person (partner 62, spouse, or ICE) 132. If, as a result of these calls, the operator 19*a* is able to confirm that the subscriber 18 is okay (i.e., that the subscriber 18 forgot to place the second contact), then the operator 19*a* would cancel 124 the alarm 118, document actions 126, and permit the remainder of the pet care notification system 10 to resume normal operations 127.

If the pet care notification service 10 operator 19*a* cannot contact/confirm any special person 132 nor obtain status regarding the subscriber 18, then the pet care notification system 10 operator 19*a* will start calling the pet care providers 30 in accordance with the subscriber 18 provided calling times and sequence or adhere with any system default/design parameters 134.

If no willing pet care provider(s) 30 can be contacted or confirmed, the pet care notification service 10 operator 19*a* (or the system 10 will automatically) set a system alert/reminder to repeat the calls periodically until a predetermined amount of time has passed 136 or until some other condition (that the subscriber 18 may specify) has occurred.

Suppose the alert 122 status remains after the predetermined amount of time has passed 136 without the operator 19*a* being able to make contact 134 with a willing pet care provider 30, the pet care notification system 10 operator 19*a* will begin calling the local police or other local authority (such as the fire department) proximate the subscriber's 18 residence to notify them of the situation including the subscriber's 18 name and address and, if available, location of the destination or activity 138. If a photo of the subscriber 18 is available to the pet care notification system 10 it can be sent to the police or search and rescue authorities who may begin a search and rescue operation for the subscriber 18, depending on the particulars of the event. The police or other authority may also arrange for the care of the subscriber's 18 pets.

Optionally, the pet care notification system 10 operator 19*a* may attempt to call other authority persons 110, such as the local chapter of the Humane Society, the ASPCA, or the subscriber's 18 veterinarian 140 to ensure that the subscriber's 18 pets are taken care of. Other authorities or people can also be specified, if desired, who may be able to provide temporary care for the subscriber's 18 pets.

The pet care provider notification service 10, upon successfully contacting any party willing to care for the subscriber's 18 pets, will then cancel 124 the alert 122. A document (record) of the action/effort taken and the results 142 for this particular event would be created. The pet care notification system 10 would then resume normal system operation 144.

Referring now in particular to FIG. 5 is a block diagram of the pet care notification system 10 of FIG. 1. In addition, please refer on occasion to FIGS. 2-4*a* and FIGS. 6-9.

The block diagram of FIG. 5 illustrates the core and fundamental functions, or processes, of the pet care notification system 10.

The block diagram illustrates the pet care notification system 10 computer and database 19 connected to the Internet 20 and to the telephone 97 system. The pet care notification system 10 computer and database 19 is used to store 32 the client-supplied or system generated information.

The subscriber 18 may have used the telephone 97 or may have used their personal computer 20*a*, 20*b* during the registration and renewal process 12 to provide all requested information 22 to the pet care notification system 10.

The stored 32 client-supplied (or system generated) information can be accessible to the subscriber 18 over the Internet 20 by way of the subscriber's 18 personal computer 20*a*, 20*b*, or any Internet 20 capable device, or possibly by telephone 97.

Whether by Internet 20, by telephone 97, text message 300 (also known as texting) or by any data-exchange capable device, when the subscriber 18 desires or needs to gain access to stored 32 client-supplied information in the pet care notification system 10 computer and database 19, access is not allowed until the subscriber 18 supplies either their user name and password 24 or their unique ID number 34 and password 24, or both, to the pet care notification system 10.

As previously described in element 54 (FIG. 2), the subscriber's 18 user ID and password 24 would need to be verified 54 prior to granting the subscriber 18 access to any stored 32 client-supplied information in the pet care notification system 10 computer and data base 19. The subscriber's 18 account status, whether active (renewed) or needing renewal 56 would also determine whether the subscriber 18 can access stored 32 client-supplied information.

Upon obtaining access, the subscriber 18 can then review, update, modify, or change personal information, or review, update, modify, or change 54 designated pet care providers 30 information stored 32 in the computer and database 19.

Additionally, the pet care notification system 10 operator 19*a* is allowed access to the stored 32 information in the pet care notification system 10 computer and database 19. Such information would also include the subscriber 18 or the partner's 62 contact information. The stored 32 information may include contact information for the designated pet care providers 30. The stored 32 information may also include the subscriber's 18 instructions for accomplishing pet care provider calling procedures in accordance with subscriber 18 instructions and system design parameters 104, 130.

The pet care notification system 10 operators 19*a* also need access to certain system-generated information created or generated by the pet care notification system 10 during the subscriber's 18 registration and renewal process 12.

Additionally, documented (records) of actions/efforts taken and results (see elements 106, 111 FIG. 3, 126 FIG. 4 and 142 FIG. 4A) obtained during the course of performing pet care notification services 10 for the subscriber 18 are preferably stored 32 in the pet care notification system 10 computer and database 19.

The block diagram of FIG. 5 fundamentally illustrates an example of one process that may be followed by the pet care notification system 10 when the pet care notification system 10 receives contact from the authorized person 98. It also provides an overview of system 10 operation for the enhanced level of service 16.

Other methods or processes for accomplishing pet care notification services 10 that are based on this disclosure are, of course, possible.

Many other variations are also possible. For example, the pet care notification system 10 may ask for (or optionally prompt for) other information from the authorized person 98. Other information may include the authority person's 98 name, or title (i.e. whether a police officer, a hospital worker, search and rescue team member, fire department personnel, coroner, etc.), or perhaps the location or status, if appropriate, of the subscriber 18.

Typically, the authorized person 98 would always enter the subscriber's 18 unique ID number 34 and their name, if the name is also present on the ID card 35.

After obtaining the unique ID number 34 from the authorized person 98, then the pet care notification system 10 operator 19a can access the subscriber's 18 stored 32 information in the computer and database 19. The pet care notification system 10 operator 19a would begin attempting to place telephone calls as previously described until someone willing to provide temporary care for the subscriber's 18 pets was reached or until all options had been exhausted and a maximum period of time for attempting to provide care had elapsed. While reliance upon and the use of the pet care, notification system 10 will greatly improve the chances that the subscriber's 18 pets will be provided for during times of emergency or incapacity of the subscriber 18, the pet care notification system 10 cannot, under all circumstances and conditions, ensure that proper care for the subscriber's 18 pets will be provided. As such, the instant invention provides a "notification" service which is distinct from providing care for the subscriber's 18 pets. The efficacy of the pet care notification system 10 is largely dependent on the accuracy of information supplied by the subscriber 18 and the willingness of the people the subscriber 18 has specified to actually provide the care. When the information 22 supplied is accurate and maintained (i.e., current) and when the designated pet care provider(s) 30 are responsive to the calling attempts made by the operator 19a and are willing to provide temporary care of the subscriber's 18 pets, the pet care notification system 10 provides a timely and important service that is unavailable by any current system or methodology.

The pet care notification system 10 may store 32 any other desired type of information to potentially improve the level of service 14, 16 provided to the subscriber 18 of the pet care notification service 10.

Whereupon the pet care notification system 10 succeeds in reaching any willing pet care provider 30, emergency contact, police, veterinarian, ASPCA, Humane Society, or any other local authority 110 who would care for the subscriber's 18 pets, then the pet care notification system 10 documents and records actions 111 taken and resumes normal system operation 106a.

Other variations are also possible. For example, the operator 19a can also attempt to make contact with the partner 62, emergency person, or any of the pet care providers 30 by way of sending them an email.

There are other possibilities for modifying the pet care notification system 10 not already mentioned. For example, it is possible that when the authorized person 98 makes the telephone call 100 that if by chance there is a surge in the number of telephone calls 100 received, the operator 19a may not be available to personally receive the telephone call 100 from the authorized person 98. In that event, the telephone call 100 may be answered by an answering machine and the authorized person 98 instructed to leave their name, telephone number, and the ID number 34. The pet care notification system 10 would then timely deliver the message to the operator 19a or alert the operator 19a about its existence.

The pet care notification system 10 stores all subscriber 18 information on the computer and database 19. The setting of the various alarms and alerts 118, 122 that occur and providing notification of the alarms 136 to the operator 19a are largely and, preferably entirely, handled by the computer and database 19. Accordingly, effective implementation of the pet care notification system 10 depends heavily on the software written for the computer and database 19, and certainly on operation of the computer and database 19.

When the subscriber 18 obtains the services of the pet care notification system 10 and an unforeseen occurrence prevents the subscriber 18 from attending to the needs of his or her pets or contacting anyone else to do so, the pet care notification system 10 causes various transformations to occur that would not otherwise occur. Either by receipt of the call 100 from the authorized person 98 or by an internal alert 118 to the operator 19a when the subscriber 18 fails to return by a specified time 114, the pet care notification system 10 causes a physical transformation of reality to occur in that the normal course of reality is altered.

Because of the pet care notification system 10 the pets will receive timely attention when before they would not have. The pets will survive when before they might not have. The pets will be well taken care of when before they certainly would have been neglected for an extended period of time, and suffered. Absent the timely care provided by the pet care notification system 10, the subscriber's 18 pets would experience trauma when the subscriber 18 suddenly becomes unable to provide care. This trauma can alter the personality of pets, causing them to become fearful, anxious, or aggressive. The pet care notification system 10 prevents an unwanted transformation of a pet that is calm, loving, and trusting to a pet that is fearful or aggressive from occurring. Also, the subscriber 18 (i.e., the pet owner, if able) will know that their pets are being cared for and so the subscriber 18 will experience relief instead of anxiety. The pet care notification system 10 transforms an anxious pet owner (i.e., subscriber 18) from a worried pet owner into a calm, assured, and relaxed pet owner.

Also, the pet care notification system 10 will provide advance notification through any of various means (by mail, email, brochures, advertising, calling) to hospitals and hospital workers, doctors, healthcare professionals, firemen, search and rescue personnel, coroners, veterinarians about the services 14, 16 provided by the pet care notification system 10. The pet care notification system 10 will advise these people where look for the ID card 35 and what the ID card 35 looks like. The pet care notification system 10 will also explain what these people should do when finding the ID card 35 if the person possessing the ID card 35 is not presently capable of caring for their pets. In this way, key people in the public domain will develop an awareness of the pet care notification system 10 and through this awareness efficacy of the pet care notification system 10 is greatly enhanced.

Referring again to FIG. 5, another application for the pet care notification system 10 is discussed when either the subscriber's 18 pets have been placed under the care of either a pet sitter or kennel, each being identified in general by the reference numeral 200. The pet sitter 200 may be watching over the subscriber's 18 pets while at the subscriber's 18 home or the pet sitter 200 may take the pets to the pet sitter's 200 home. The kennel 200 may include any place for boarding cats, dogs, or any other type of pet (or animal). The kennel 200 may be a facility designed just for the boarding of pets or it may be included as part of a veterinary hospital.

The subscriber 18 may subscribe to either the basic level of the pet care notification service 14 or to the enhanced level of the pet care notification service 16 and store their pets at the kennel 200 or under the care of the pet sitter 200. Whether to offer a specialized service, as described in greater detail hereinafter, for use with the kennel 200 or pet sitter 200 for either the basic level of the pet care notification service 14 or for the enhanced level of the pet care notification service 16 or both, is, of course, a decision for the implementers of the pet care notification system 10 to make, as desired.

However, it is possible that if the pets are at the kennel 200 or at the pet sitter's 200 and if no additional facility was made for this situation that the designated pet care providers 30 would not know where to go to care for the subscriber's 18 pets. Also, if the subscriber 18 did not return to pick up their pets from the kennel 200 or from the pet sitter 200, the kennel 200 personnel or the pet sitter 200 would be at a loss as to what was happening and what they should do. Should they (pet sitter/kennel 200) return the pet(s) to the subscriber's 18 home or continue to provide care for the pets? Are they even able to continue to provide such care? For example, the pet sitter 200 may be leaving on vacation the next day and unable to continue providing care for the subscriber's 18 pets. If the subscriber 18 is incapacitated or deceased or otherwise unable to be telephoned (or contacted in anyway), there is no way for the kennel 200 or the pet sitter 200 to know what has happened or determine what they should do.

This situation can arise for either the basic level of the pet care notification service 14 or for the enhanced level of the pet care notification service 16. Accordingly, it is desirable to allow the subscriber 18 to contact the pet care notification system 10 whenever a circumstance arises in which the subscriber 18 will be taking their pets to the kennel 200 or placing their pets under the care of the pet sitter 200. The contact by the subscriber 18 is preferably accomplished automatically by use of the telephone 97 or automatically over the Internet 20 by accessing the pet care notification system computer and database 19. If communication with the operator 19a is required, a surcharge may be imposed.

During contact, the subscriber 18 would have to provide their ID number 34 and password 24 to gain access to their account.

During contact, the subscriber 18 will inform the pet care notification system 10 that they are taking their pets to the kennel 200 or to the pet sitter 200. The subscriber 18 can specify which of their pets are being taken if all of the subscriber's 18 pets are not being taken to the same kennel 200 or to the same pet sitter 200. If some of the subscriber's 18 pets are being taken to one of the kennels 200 and other pets are being taken to another one of the kennels 200 or if the pets are being split between one or more of the kennels and one or more of the pet sitters 200, the subscriber 18 may be provided with opportunity to list where each pet is being taken. If the pet sitter 200 is taking the pets to his or her home or facility the subscriber 18 may be able to provide this information. If any pets are left at the subscriber's 18 home, this information may also be provided to the pet care notification system 10.

The subscriber 18 would provide telephone numbers to the pet care notification system 10 for the pet sitter 200 and the kennel 200. The subscriber 18 would also provide an anticipated latest return time to the pet care notification system 10 to indicate when the subscriber 18 would be resuming care for his or her pets. The latest return time would, in a manner similar to that previously described, be used by the computer 19 of the pet care notification system 10 to create a timer that, if not canceled, would alert the operator 19a when the latest return time was reached if the subscriber 18 had not called to cancel the event. Again, upon returning home to resume care the subscriber 18 would again contact the pet care notification system 10 to inform the pet care notification system 10 of their return, which would automatically cancel the timer/alarms that were set.

If the subscriber 18 failed to make contact with the pet care notification system 10 before the latest return time was reached, the computer-generated alert to the operator 19a would prompt the operator 19a to take action. The operator 19a would open the subscriber's 18 file from the computer and database 19 and determine the involvement of the pet sitter 200 or the kennel 200.

The operator 19a would place at least one call to the subscriber 18 to verify whether the subscriber 18 had simply forgotten to place the call on their return. Alternately, the system 10 can send an automatic text message 300 inquiry to the subscriber 18 as described elsewhere, herein. If the operator 19a was able to determine that the subscriber 18 was okay and able to care for his or her pets, no further action (other than documentation) would occur.

If, however, the operator 19a was unable to determine if the subscriber 18 was indeed, okay, and if one or more pet sitters 200 and/or kennels 200 were actively providing care for the subscriber's 18 pets, the operator 19a would place calls in a manner consistent with responding for the enhanced level of the pet care notification service 16 as shown on FIG. 4A while also contacting the pet sitter(s) 200 and/or the kennel(s) 200. The exact sequence of timing of calls is a system variable that follows whatever is deemed to be the most preferred protocol of placing calls by the operator 19a. For example, the operator 19a may begin by placing a call to the pet sitter/kennel 200 to notify them of the situation or the operator 19a may begin by placing one or more calls to other contact people or to the designated pet care providers 30 and call the pet sitter/kennel 200 shortly thereafter, perhaps after having first located a willing pet care provider 30.

Regardless of the sequence of calls placed by the operator 19a, the pet sitter 200 or kennel 200 would be notified of the situation by a special call 202 that the operator 19a makes to the pet sitter 200 or the kennel 200. They would be informed as to the wishes of the subscriber 18 which, typically, would include the transference of control/care of the subscriber's 18 pets from the pet sitter 200 or kennel 200 to the willing designated pet care provider 30, as identified in general by reference numeral 204.

Preferably, the subscriber 18 would have provided this information in advance to the kennel 200 or pet sitter 200 in the form of instructions or a written and signed directive. It may be possible for the subscriber 18, depending on the features of the pet care notification system 10, to create such directives and authorize the pet care notification system 10 to provide the directive to the kennel 200 or to the pet sitter 200 during times of such emergency.

Basically, the pet care notification system 10 will inform the pet sitter 200 or kennel 200 of the situation and that, when found, a willing designated pet care provider 30 will be assuming control of the subscriber's 18 pets. The pet care notification system 10 would inform the pet sitter 200 or the kennel 200 of the name of the pet care provider 30 and, if desired, provide the pet sitter 200 or the kennel 200 with whatever forms may be required for the release of the subscriber's 18 pets, assuming of course that such forms had been prepared in advance and were available online on the computer and database 19 to the pet care notification system 10 for distribution. Of course, the operator 19a would also have to inform the willing pet care provider 30 that the subscriber's 18 pets (which ones) were not at the subscriber's 18 home but that they were at the kennel 200 or at the pet sitter's 200 residence/facility.

The pet care provider 30 could pick up the subscriber's 18 pets from the pet sitter 200 or from the kennel 200 or the pets could be delivered to the pet care provider 30. Alternately, the subscriber's 18 pets may be left with the pet sitter 200 or at the kennel 200 for a predetermined period of time, if that is acceptable to all involved.

It is also possible that the call 100 could be placed to the pet care notification system 10 by the authorized person 98 in a manner consistent with that described earlier for the basic level of the pet care notification service 14. If the pet sitter 200 or the kennel 200 were providing care for the subscriber's 18 pets, the operator 19a would again be made aware of this upon accessing the subscriber's 18 files in the database 19. After verifying the validity of the call 102 the operator 19a would respond in a manner consistent with the teachings described earlier (and shown in FIG. 3) and the operator 19a would also contact the pet sitter 200 or the kennel 200 and provide the same information as described above to the pet sitter 200 or the kennel 200. The operator 19a would also inform the pet care provider 30 as to the location of the subscriber's 18 pets (i.e., at the pet sitter 200 or at the kennel 200) and transfer any authorizing directives that may be available to the pet care notification system 10.

In this way, seamless care is provided for the subscriber's 18 pets when they are located away from the subscriber's 18 home.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

The invention claimed is:

1. A pet care notification system for helping to ensure that a level of care will be provided to a pet or an animal owned or managed by a subscriber to the pet care notification system in the event the subscriber becomes unable to provide the level of care, comprising:
   (a) a database operatively connected to a computer, wherein said database includes information about the subscriber and information about a person who has been designated as a contact person by the subscriber;
   (b) means for uniquely identifying the subscriber of the pet care notification system;
   (c) wherein, subsequent to an occurrence of a trigger event, an employee or operator of the pet care notification system is provided with an alarm by the pet care notification system of said occurrence of said trigger event;
   (d) wherein subsequent to said alarm said employee or operator is able to access said information about said contact person from said database;
   (e) wherein said employee or operator follows an established procedure to attempt to communicate with said contact person; and
   (f) the subscriber providing a predetermined time by which the subscriber agrees to contact the service, and wherein an event is created by the service, and wherein a timer uses said predetermined time to either cancel said event or to provide said alarm to said employee or operator, and wherein if the subscriber contacts the service prior to the predetermined time said alarm is canceled, and wherein if the subscriber fails to contact the service prior to said predetermined time, a step of providing said alarm to said employee or operator of the pet care notification system is accomplished.

2. The pet care notification system of claim 1 wherein said occurrence of said trigger event includes an authorized person informing the pet care notification system of an incapacity or death of the subscriber, and wherein said authorized person is selected from the group consisting of police officer, law enforcement person, fire personnel, emergency worker, doctor, coroner, hospital employee, search and rescue person, and employee of a morgue or any other person that the pet care notification system determines is able to act as said authorized person.

3. A method for providing pet care notification to a contact person for helping to ensure that a level of care will be provided to a pet or an animal owned or managed by a subscriber to a service that provides the pet care notification method in the event the subscriber becomes unable to provide the level of care, comprising:
   (a) providing a database operatively connected to a computer and storing information about the subscriber and information about the contact person in said database;
   (b) including means for the subscriber to provide or update said information about the subscriber and said information about the contact person by the subscriber;
   (c) providing means for ascertaining the identity of the subscriber of the pet care notification system;
   (d) providing an alarm to an employee or operator of the pet care notification system subsequent to an occurrence of a trigger event or sending a text message inquiry to the subscriber in response to said occurrence of said trigger event;
   (e) providing said employee or operator access to said information about the contact person and to said information about the subscriber from said database;
   (f) following an established procedure to attempt to communicate with the contact person; and
   (g) the subscriber providing a predetermined time by which the subscriber agrees to contact the service, and wherein an event is created by the service, and wherein a timer uses said predetermined time to either cancel said event or to provide said alarm to said employee or operator, and wherein if the subscriber contacts the service prior to the predetermined time said alarm is canceled, and wherein if the subscriber fails to contact the service prior to said predetermined time, a step of providing said alarm to said employee or operator of the pet care notification system is accomplished.

4. The method for providing pet care notification of claim 3 wherein the step of providing means for ascertaining the identity of the subscriber includes assigning a unique identification number to the subscriber when the subscriber enrolls in the service that offers the method for providing pet care notification.

5. The method for providing pet care notification of claim 4 wherein the step of assigning a unique identification number to the subscriber includes the step of sending one or more identification cards to the subscriber after the subscriber has completed enrollment in the service, wherein each of said identification cards includes said unique identification number printed thereon.

6. The method for providing pet care notification of claim 4 wherein the step of assigning a unique identification number to the subscriber includes the step of sending to the subscriber by way of email a temporary ID card that the subscriber can print and utilize if the subscriber does not have possession of a more formal version of an identification card.

7. The method for providing pet care notification of claim 3 wherein the step of storing said information about the subscriber and said information about the contact person in said database includes the step of storing information about a plurality of contact people in said database.

8. The method for providing pet care notification of claim 3 wherein the step of following an established procedure to attempt to communicate with the contact person includes the step of attempting to make contact with a first contact person designated by the subscriber and, if contact is made, asking said first contact person if he or she is willing to assume responsibility for providing the level of care to the pet or animal.

9. The method for providing pet care notification of claim 8 wherein the step of attempting to make contact with said first contact person includes the step of placing a telephone call or sending an email or both to said first contact person.

10. The method for providing pet care notification of claim 8 wherein the step of following an established procedure includes the step of attempting to make contact with a second contact person designated by the subscriber in the event contact cannot be made with said first contact person or in the event said first contact person is unwilling to assume responsibility for providing the level of care and, if contact is made with said second contact person, asking said second contact person if he or she is willing to assume responsibility for providing the level of care to the pet or animal.

11. The method for providing pet care notification of claim 8 wherein the step of following an established procedure includes the step of storing a log of the actions taken and any results arising from said actions taken by said employee or operator in said database.

12. The method for providing pet care notification of claim 8 wherein the step of following an established procedure includes the step of attempting to make contact with each additional contact person designated by the subscriber in successive order in the event contact cannot be made with said first contact person or in the event said first contact person is unwilling to assume responsibility for providing the level of care and, if contact is made, asking said additional contact person if he or she is willing to assume responsibility for providing the level of care to the pet or animal.

13. The method for providing pet care notification of claim 8 wherein the step of following an established procedure includes the step of attempting to make contact with an authority in the event that contact cannot be made with said first or second contact person or with said additional contact person that has been designated by the subscriber or in the event that neither said first or second contact person nor said additional contact person with whom contact is made is willing to provide the level of care to the pet or animal.

14. The method for providing pet care notification of claim 13 wherein the step of attempting to make contact with said authority includes the step of attempting to make contact with said authority selected from the group consisting of a branch or department of a Humane Society that is disposed proximate the subscriber, a branch or department of The Society for the Prevention of Cruelty to Animals that is disposed proximate the subscriber, a veterinarian that is disposed proximate the subscriber, an animal care or animal welfare society or group that is disposed proximate the subscriber, a police or law enforcement department that is disposed proximate the subscriber, a fire department that is disposed proximate the subscriber, and a department of a branch of government that is disposed proximate the subscriber.

15. The method for providing pet care notification of claim 14 including the step of said employee or operator contacting said authority to verify an identity of said authorized person after the step of said authorized person providing notification to the service and prior to the step of following an established procedure to attempt to communicate with said contact person.

16. The method for providing pet care notification of claim 3 wherein the step of providing an alarm to an employee or operator of the pet care notification system subsequent to an occurrence of a trigger event includes the step of providing said alarm to said employee or operator of the pet care notification system subsequent to an authorized person providing notification to the service regarding an inability of the subscriber to provide the level of care.

17. The method for providing pet care notification of claim 16 wherein the step of said authorized person providing notification to the service includes the step of said authorized person providing notification to the service subsequent to the occurrence of an injury, incapacitation, or death of the subscriber.

18. The method for providing pet care notification of claim 16 wherein the step of said authorized person providing notification to the service includes the step of said authorized person providing notification to the service when said authorized person is selected from the group consisting of police officer, law enforcement person, fire personnel, emergency worker, doctor, coroner, hospital employee, search and rescue person, and employee of a morgue.

19. The method for providing pet care notification of claim 16 wherein the step of said authorized person providing notification to the service includes the step of said authorized person placing a telephone call or using the Internet to contact the service subsequent to the occurrence of an injury, incapacitation, or death of the subscriber, and providing an identification number to the service.

20. The method for providing pet care notification of claim 3 wherein the step of providing an alarm to an employee or operator of the pet care notification system subsequent to an occurrence of a trigger event includes the step of providing said alarm to said employee or operator of the pet care notification system subsequent to a failure of the subscriber to cancel an event before a predetermined time.

21. The method for providing pet care notification of claim 3 wherein the step of sending a text message inquiry to the subscriber in response to said occurrence of said trigger event includes said computer automatically sending said text message inquiry to the subscriber to determine the status of the subscriber, and wherein a reply text message from the subscriber is requested, and wherein if said reply text message is received by said computer within a predetermined period for reply, said computer discerns the content of said reply text message, and wherein subsequent to a determination of the content of said reply text message that said subscriber is able to resume providing care for the subscriber's pets, said computer does not provide said alarm to said employee or operator.

* * * * *